United States Patent
De La Rosa et al.

(10) Patent No.: US 11,628,477 B1
(45) Date of Patent: Apr. 18, 2023

(54) CAMERA-BASED TRACKING SYSTEMS FOR ITEM SORTATION SYSTEMS

(71) Applicant: Amazon Technologies, Inc., Seattle, WA (US)

(72) Inventors: Jose Luis De La Rosa, Seattle, WA (US); Larry Joe Robb, Miramar Beach, FL (US); Stanislava Yoshkova Petkova, Seattle, WA (US); Justin Stone, Frisco, TX (US); Joshua Martin Middleton, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 374 days.

(21) Appl. No.: 16/909,303

(22) Filed: Jun. 23, 2020

(51) Int. Cl.
| | |
|---|---|
| *B07C 5/36* | (2006.01) |
| *B25J 9/00* | (2006.01) |
| *G06N 20/00* | (2019.01) |
| *G06Q 10/087* | (2023.01) |
| *B25J 19/02* | (2006.01) |

(52) U.S. Cl.
CPC .............. *B07C 5/36* (2013.01); *B25J 9/0093* (2013.01); *B25J 19/023* (2013.01); *G06N 20/00* (2019.01); *G06Q 10/087* (2013.01)

(58) Field of Classification Search
CPC .......... B07C 5/36; G06N 20/00; B25J 9/0093; B25J 19/023; G06Q 10/087
See application file for complete search history.

(56) References Cited

U.S. PATENT DOCUMENTS

| | | | |
|---|---|---|---|
| 2017/0157649 A1* | 6/2017 | Wagner | B07C 3/008 |
| 2019/0233213 A1* | 8/2019 | Phan-Quiroga | G06Q 10/08 |
| 2019/0311325 A1* | 10/2019 | Reblin | G06Q 10/0836 |
| 2021/0094073 A1* | 4/2021 | Volta | B07C 3/08 |

* cited by examiner

*Primary Examiner* — Kyle O Logan
(74) *Attorney, Agent, or Firm* — Eversheds Sutherland (US) LLP

(57) ABSTRACT

Systems, methods, and computer-readable media are disclosed for camera-based tracking systems for item sortation systems. In one embodiment, an example method may include determining, by a controller using first image data from a camera configured to image an aisle of an item sortation machine, a first item disposed on a first shuttle at a first location, where the first shuttle is in motion to a first designated drop off location, determining a first shuttle identifier of the first shuttle, and determining the first designated drop off location using the first shuttle identifier. Example methods may include determining that the first item has fallen onto a floor of the aisle, and determining that the first item was not delivered to the first designated drop off location.

18 Claims, 12 Drawing Sheets

CAMERA-BASED TRACKING SYSTEMS FOR ITEM SORTATION SYSTEMS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that manual efforts can be redirected to different tasks.

Figure 1:
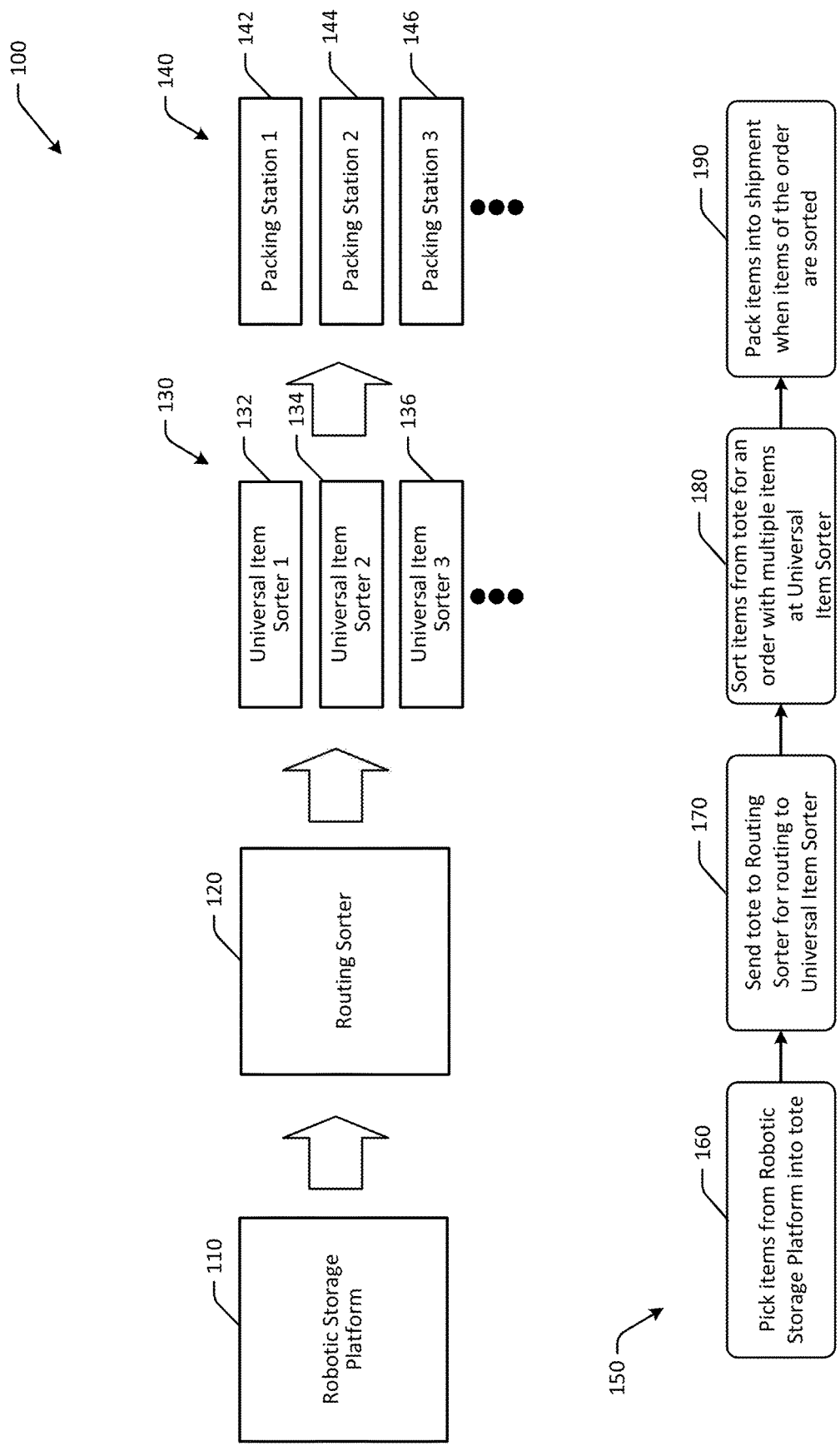
FIG. 1 is a hybrid schematic illustration of an example use case for camera-based tracking systems for item sortation systems and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. After products are picked, the products may be placed in a container, such as a tote or other container, and directed to sortation machines to direct the picked products to the appropriate packing station. For example, products in the same order may be directed to the same packing station for consolidation and subsequent packing.

Accordingly, some machines and/or systems may handle a relatively high volume of items, such as products or other objects, during operation. In one example, an item sortation system, such as a system configured to sort items for particular orders, or to sort packages intended for certain destinations or regions, may handle upwards of one million items per day. Some items, such as lightweight or flat items, may be difficult to handle using machines or robots due to issues such as the item falling off of a machine during transport, the item slipping through gaps in a machine, and so forth. In one example, gift cards may be difficult to handle in item sortation machines because the gift cards may fly off of shuttles used to transport the gift card within the item sortation system. As a result, the gift cards or other lightweight items may fall to a floor of the item sortation system or other machine, and may have to be manually retrieved and sorted, thereby causing delays in processing. In addition, such incidents may create other issues, such as incorrect or inaccurate inventory statuses (e.g., an item may be marked as delivered to a container, when in fact it fell on the floor, or an item may be marked not delivered, when in fact it was delivered, etc.).

Embodiments of the disclosure include camera-based tracking systems for item sortation systems that may be configured to track items and/or shuttles transporting items in an item sortation system, so as to provide improved inventory statuses, detect items that have fallen onto a floor of the item sortation system, automatically trigger an automated sweeper system to sweep items off the floor of the item sortation system to facilitate retrieval, and/or other functions to improve functionality and efficiency of item sortation systems. Some embodiments may be standalone systems, while other embodiments may be integrated into item sortation systems. Certain embodiments may be configured to monitor shuttle performance and predict movement of items on shuttles, detect problematic areas, predict maintenance issues, schedule maintenance, and other functions. Some embodiments may utilize machine learning algorithms to improve camera-based detection of various shuttle issues, items, and the like. Some embodiments may include automated sweeper systems that automatically sweep items that have fallen to a floor of an item sortation system or other surface (e.g., a floor of the fulfillment center, etc.) to a removable pan or tray that can be easily accessed and re-inducted into the item sortation system or manually sorted. As a result, operation of the item sortation system may not have to be paused to allow manual access and retrieval of fallen items, thereby increasing operator safety and improving sortation throughput. Some embodiments include automated sweeper systems that may move about a floor of an item sortation system in a unidirectional or bidirectional path to sweep items that have fallen into one or more areas of the item sortation system, such as a removable pan disposed at an end of the item sortation system. The removable pan may be safely accessible to an operator, who may then re-induct the items or manually sort the items without having to access an internal portion of the item sortation system.

Item sortation systems may include one or more shuttles used to transport items from an induction portion of the item sortation system to a particular chute or bin that is associated with a particular online order or geographic destination. Other embodiments may include chutes may be associated with different criteria. The shuttles may include onboard conveyors and may travel vertically and/or horizontally inside the item sortation system to transport items to particular chutes. During normal operation, items may fall off the shuttles while in transit to a destination, and may accumulate on the floor of an aisle of the item sortation system. In addition, items that fall off of the shuttles may not be detected, and may be incorrectly marked as delivered to a container, thereby creating inventory issues due to incorrect item delivery status (e.g., an item for an order may be marked delivered, but may not have actually been delivered, etc.). As a result, order fulfillment may be delayed and/or inventory shortages may be created due to replacement items being retrieved while an item is on the floor. Items on the floor may potentially obstruct the travel path of the shuttles, and may therefore cause jams or collisions resulting in unplanned downtime, damaged items, and/or damage to the shuttles or the item sortation system.

Certain embodiments include one or more overhead cameras positioned to image an aisle of an item sortation system. Data from the cameras may be used to track items and/or shuttles as the shuttles move in the item sortation system. The cameras may be coupled to a computer system or controller that may be configured to communication with a computer system or controller of the item sortation system. For example, the controller associated with the camera system may send data related to missing or undelivered items, timestamps, shuttle identification codes, and so forth to the computer system associated with the item sortation system. The item sortation system computer may use the received data to update virtual inventory information associated with containers (e.g., totes, cases, bins) and flag containers for quality control and other issues. Some embodiments may determine that an amount of items on a floor of an aisle, such as a certain number of items, a certain volume of items (e.g., including the volume of a single item, etc.), a certain amount of occupied floor space, etc. meets or exceeds a corresponding configurable threshold, and may trigger automated sweepers that may be installed internally on an aisle of an item sortation system at floor level and may be configured to travel the length of the aisle performing a sweeping process. Other factors, such as positioning of fallen items, may also be used to trigger automated sweepers. Automated sweepers may include interchangeable heads that can be made with a flexible material (e.g., rubber, brush bristles, etc.) that may be coupled to a housing of the automated sweeper. The automated sweeper may travel on a linear track using rotational electric motors, magnetic linear motors, or other propulsion devices. The automated sweeper may be deployed on an existing track used by shuttles of the item sortation system, and may be stowed in a home position that will permit normal operation of the shuttles. The automated sweeper may be initiated at the shuttle loader area of the item sortation system, and may end at an aisle access door. In other embodiments, the automated sweeper may be initiated and end at a different position, or may be initiated and end at the same position. Some embodiments may include modified access doors that include an object discharge section that will allow objects to be discharged without the need to open the access door.

Embodiments of the disclosure include camera-based tracking systems for item sortation systems that may improve processing and fulfillment of various sortation tasks at a fulfillment center, such as sortation of multi-item orders, or orders that include more than one item. Certain embodiments include item sortation systems with modular sorting machines that can be combined to form larger sorting machines, and that include receiving bins coupled to one or more sides (e.g., opposite sides, etc.) of the sorting machine to increase throughput and speed of consolidating items for multi-item orders. Some embodiments include optimized process flows for processing of orders at fulfillment centers, as well as process flows or methods to increase speed of consolidating products in a multi-item order. As a result, throughput of fulfillment centers may be improved, and/or logistics of fulfillment center operations may be less complicated.

Referring to FIG. 1, an example use case 100 for camera-based tracking systems for item sortation systems and an example process flow in accordance with one or more embodiments of the disclosure. Although discussed in the context of online orders, other embodiments may be directed to any suitable use case where items are picked and sorted, such as instances where users may pick up orders rather than receiving a shipment, instances where packages are sorted based on geographic regions, and so forth.

In FIG. 1, a fulfillment center may include a robotic storage platform 110, a routing sorter 120, one or more item sortation systems or universal item sorters 130, and one or more packing stations 140. The robotic storage platform 110 may be a portion of the fulfillment center at which products picked from product inventory are placed. Robots may be used to pick products from inventory and to deliver to the robotic storage platform in some instances, while in other instances, manual labor or a combination thereof may be used to pick products. The picking process at the robotic storage platform may include locating a product in an order, obtaining the product, and sending the product to the robotic storage platform 110, such as via a conveyor belt. In the illustrated embodiment, products at the robotic storage platform 110 may be placed in a container, such as a tote. In some embodiments, the tote may be assigned to, or otherwise associated with, a particular universal item sorter machine. For example, a certain tote may be associated with a certain universal item sorter, such that products that are designated to be picked and placed in the tote are for orders that are to be consolidated at that particular universal item sorter.

At the routing sorter 120, totes including products that have been picked may be routed to the appropriate or designated universal item sorter. For example, the routing sorter 120 may determine an identifier associated with the tote, and may determine the universal item sorter associated with the tote using the identifier. The routing sorter 120 may route or direct the tote to the appropriate universal item sorter. In other embodiments, the tote may be directed to a random universal item sorter or a selected universal item sorter based on capacity.

The universal item sorters 130 may include one or more item sortation machines. In FIG. 1, a first universal item sorter 132, a second universal item sorter 134, a third universal item sorter 136, and so forth may be included. Any number of universal item sorters may be included. Some or all of the universal item sorters may be optionally associated with certain totes. The universal item sorters may be used to consolidate or otherwise aggregate products for multi-item orders. For example, a first tote may include a first item of a multi-item order, and a second tote may include a second item of the multi-item order. The universal item sorter may therefore identify the orders associated with the respective products in a tote, and may transport the products to a container, such as a bin, associated with the order. When the order is complete with all of the products in the associated bin, the order may be packed. Accordingly, a specific universal item sorter may be designated for fulfillment of a particular multi-item order. As a result, all of the products in the multi-item order may be placed in totes that are associated with, or otherwise directed to, that particular universal item sorter. At the universal item sorters 130, totes that are received via the routing sorter 120 may be emptied, and the products in the respective totes may be transported to the appropriate bins for the orders for which the products were picked. Example universal item sorters or item sortation systems are discussed with respect to at least FIGS. 3-4.

After a multi-item order is complete (e.g., the universal item sorter has delivered all of the products in the order to the appropriate bin, etc.), the order may be packed at the packing station 140. In some embodiments, one or more packing stations may be included. In some instances, a packing station may service more than one universal item sorter, while in other instances, more than one packing station may service one universal item sorter. In the illustration of FIG. 1, a first packing station 142 may be used to pack orders from the first universal item sorter 132, a second packing station 144 may be used to pack orders from the second universal item sorter 134, a third packing station 146 may be used to pack orders from the third universal item sorter 136, and so forth. At the packing stations 140, the orders may be placed into boxes and sealed for subsequent shipment. The packages may then be processed for shipment to the user.

At the fulfillment center, an example process flow 150 illustrated in FIG. 1 may be implemented to improve the efficiency and/or throughput of the fulfillment center. At a first block 160, items may be picked from the robotic storage platform 110 into a tote. The tote may be associated with a specific universal item sorter in some embodiments. At a second block 170, the tote may be sent to the routing sorter 120 for routing to a universal item sorter. At a third block 180, the items from the tote may be sorted for an order with multiple item by the universal item sorter. At a fourth block 190, the items may be packed into a shipment when all of the items in the order are sorted.

Figure 2:
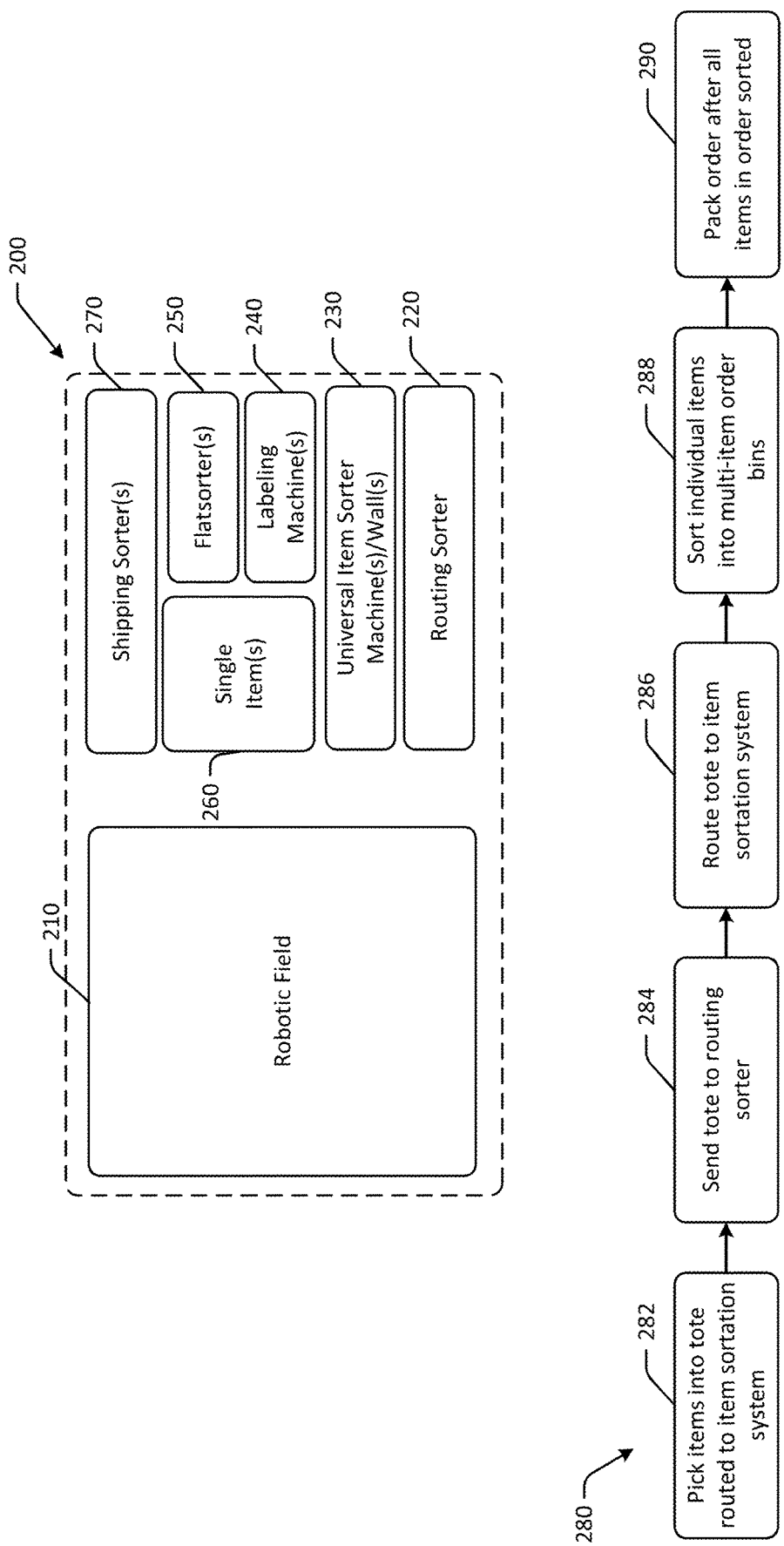
FIG. 2 is a hybrid schematic illustration of an example use case for camera-based tracking systems for item sortation systems and an example process flow in accordance with one or more embodiments of the disclosure.

FIG. 2 is a hybrid schematic illustration of an example use case for camera-based tracking systems for item sortation systems and an example process flow in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking, one or more routing sorters 220 that may be used to consolidate products for multi-item orders, one or more universal item sorter machines/walls 230 that may be used to pack multi-item orders, one or more single item sections 260 that may be used to pack single item orders, one or more labeling machines 240 that may be used to apply shipping labels to packages, one or more flat sorters 250 and shipping sorters 270 to sort labeled shipments (e.g., by destination, carrier, etc.) for pickup from the fulfillment center 200. In some embodiments, the flat sorters 250 and shipping sorters 270 may be combined into a single section.

The fulfillment center 200 may implement a process flow 280 for processing multi-item orders. At a first block 282, items for different orders may be picked into a tote that routed to an item sortation system, such as one of the universal item sorter machines 230. The tote may include items from any order that is being consolidated by the specific universal item sorter machine. The universal item sorter machine may sort singular items into multi-item orders. At a second block 284, the tote may be sent to a routing sorter. At a third block 286, the routing sorter may route or divert the tote to a universal item sorter machine. At a fourth block 288, the universal item sorter machine may sort singular items into multi-item order bins. At a fifth block 290, the order may be packed after all items in the order are sorted.

The universal item sorter machines 230 may include chutes that may lead to bins or containers of different sizes (e.g., small, medium, large, etc.). The universal item sorter machines 230 may be configured, in one example, to handle items that weigh up to twenty or more pounds. In some embodiments, the universal item sorter machines 230 may include multiple chutes, such as about 328 chutes, and may be configured to sort items at a rate of about 2,100 units per hour. In some instances, the universal item sorter machines 230 may have two inductors (e.g., one on each side, etc.), and may be modular. For example, the universal item sorter machines 230 may each include sixteen expansion modules, where expansion modules may be defined as three two-sided columns next to one another for a total length of about 80 feet. The universal item sorter machines 230 may reduce labor and capital costs associated with processing orders.

In some embodiments, the universal item sorter machines 230 may replace other processes, such as manual processes. For example, manual clearance of items that have fallen onto a floor of an aisle of the item sortation system may be a bottleneck that is avoided by the systems and methods described herein. The universal item sorter machines 230 may include cross-belt shuttles that can be used to transport singulated products to chutes, and subsequently, into containers or totes. Universal item sorter machines 230 may be capable of sorting at a rate of 2,100 units per hour. Certain universal item sorter machines 230 may be configured to handle items of up to and including twenty pounds, or more in some instances, with dimensions of about 18"×14"×8", which may cover almost all products at the fulfillment center 200. The universal item sorter machines 230 may operate as a high-speed, high-destination sort solution that intakes items or packages and sorts them into containers using a shuttle that travels vertically and horizontally inside the machine (or outside in some instances).

Individual universal item sorter machines may be item sortation systems, and may include a number of, such as two or more, modular sorting machines coupled in series, or otherwise adjacent to each other and connected. The modular sorting machines may include a first modular sorting machine. The modular sorting machines may be configured to singulate items from a tote comprising a plurality of items into a plurality of bins (e.g. induct individual items from a bin that has multiple items, and place the inducted items into the appropriate bin, where bins are associated with multi-item orders. The tote from which items are inducted may be associated with the individual universal item sorter machine (e.g., the modular sorting machines that form the individual universal item sorter machine, etc.).

Accordingly, in some embodiments, universal item sorters may be arranged in rows and may receive assigned totes from a routing sorter, thereby streamlining fulfillment center operation and reducing labor and space costs. The universal item sorters may process totes for multi-order sortation and consolidation. As a result, there may no longer be a need to singulate and send items to a wall for manual extraction, because each tote may be assigned to a particular universal item sorter machine. Induct stations can be replaced with universal item sorter machines.

In another embodiment, pickers may pick items directly to a segmented belt conveyor at a station that is near a universal item sorter machine. Other nearby pick stations may also pick items directly to conveyance for the same universal item sorter machine. Picked items being transported to a single universal item sorter machine may merge together to be inducted into their unique universal item sorter machine, where multi-item orders may be consolidated and sent to packing.

Embodiments of the disclosure include camera-based tracking systems for item sortation systems. Certain embodiments may improve processing speed and/or throughput of fulfillment centers. Certain embodiments may improve performance of mechanical equipment for sortation and/or consolidation of items for multi-item orders. While described in the context of online orders, aspects of this disclosure are more broadly applicable to other forms of object sortation, such as the sortation of packages that are to be shipped or are in transit.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 3:
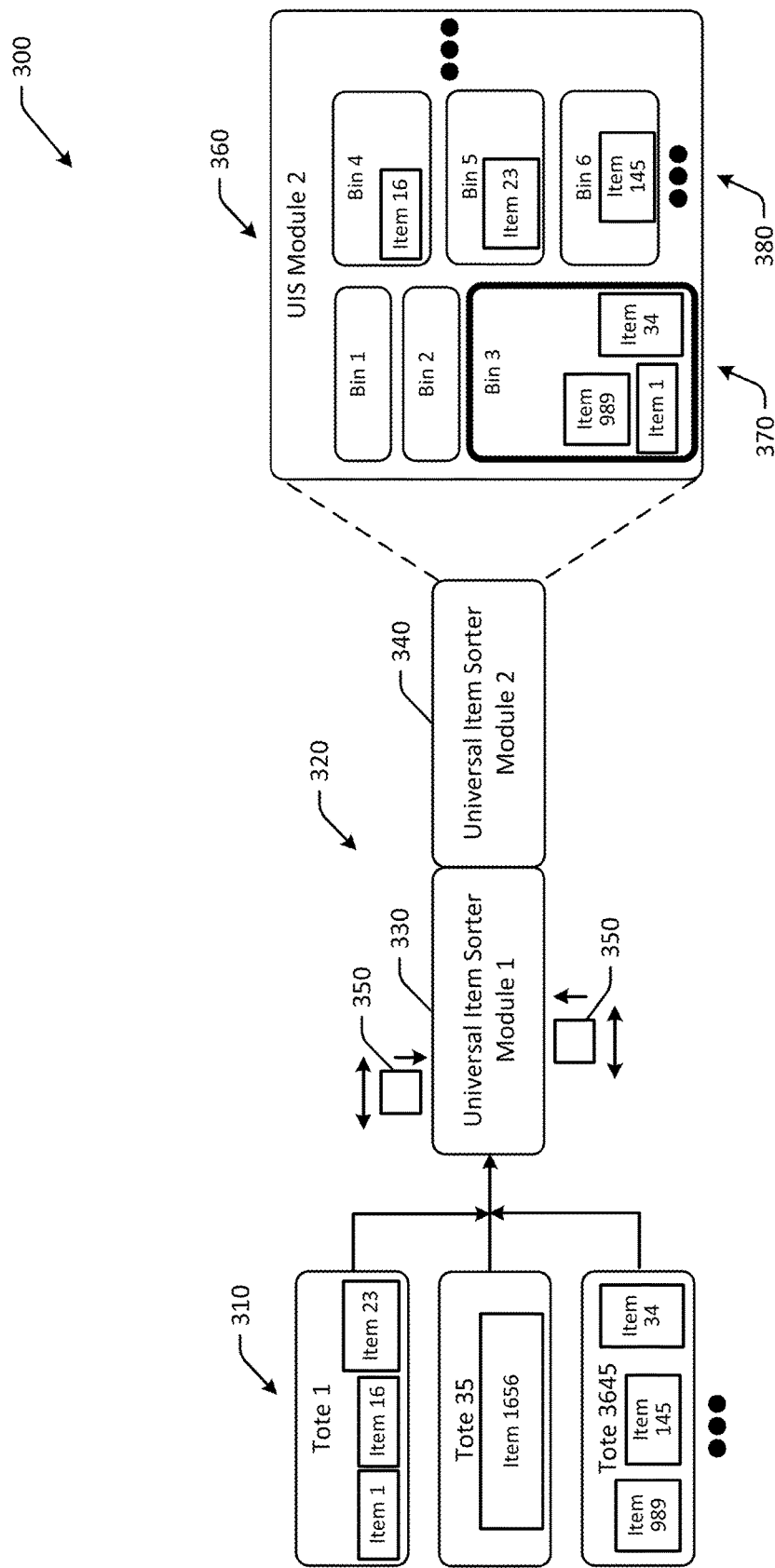
FIG. 3 is a schematic illustration of an item sortation system and additional components in accordance with one or more embodiments of the disclosure.

FIG. 3 is a schematic illustration of an item sortation system and additional components in accordance with one or more embodiments of the disclosure. Other embodiments may include additional or fewer components. The illustration of FIG. 3 is not to scale, and may not be illustrated to scale with respect to other figures. The universal item sorter illustrated in FIG. 3 may be the same universal item sorter discussed with respect to FIGS. 1-2.

In FIG. 3, an example use case 300 including a set of totes 310 and an item sortation system, or a universal item sorter machine 320, is depicted. The set of totes 310 may include one or more totes that may be assigned to, or otherwise associated with, the universal item sorter machine 320. For example, Tote 1, Tote 35, Tote 3645, and so forth may be associated with the universal item sorter machine 320. The totes may have identifiers, such as alphanumeric or other identifiers. The totes may be used to place items that have been picked into the totes. The items that are placed in the totes may be associated with orders that are to be consolidated by the universal item sorter machine 320. For example, Tote 1 may include item 1, item 16, and item 23, Tote 35 may include item 1656, Tote 3645 may include item 989, item 145, and item 34, and so forth. The item sortation system, or the universal item sorter machine 320, may be configured to receive items from a tote that includes one or more, such as multiple items, and the tote may be assigned to the item sortation system or the universal item sorter machine 320.

The totes 310 may be directed to the universal item sorter machine 320 for sorting and consolidation. For example, items in the totes 310 may be inducted into the universal item sorter machine 320 via a conveyor belt.

The universal item sorter machine 320 may include one or more modules, and may be adjusted in size by adding or removing modules as needed. For example, the universal item sorter machine 320 may include a first modular item sorting machine 330 and a second modular item sorting machine 340. The second modular item sorting machine 340 may be coupled to the first modular item sorting machine 330.

The first modular item sorting machine 330 may include a first support disposed on a first side of the first modular item sorting machine 330, and a second support disposed on the first side of the first modular item sorting machine 330. The first support and the second support may form a first chute between the first support and the second support. The chute(s) may be accessible via an aisle disposed at or near a center of the item sortation machine. In some embodiments, chutes may be disposed at both sides of the aisle. Some item sortation machines may include more than one aisle. The first modular item sorting machine 330 may include a first bin positioned at a first vertical location in the first chute, and a second bin positioned at a second vertical location in the first chute. The first bin and the second bin may have the same height or different heights. In some embodiments, chutes may be disposed about more than one side of the first modular item sorting machine 330.

The second modular item sorting machine 340 may include a third support disposed on the first side of the second modular item sorting machine 340, and a fourth support disposed on the first side of the second modular item sorting machine 340. The third support and the fourth support may form a second chute. The second modular item sorting machine 340 may include a third bin positioned at a first vertical location in the second chute, and a fourth bin positioned at a second vertical location in the second chute. The third bin and the fourth bin may have the same height or different heights, and may have different heights than the first bin and/or the second bin. The first bin, the second bin, the third bin, and/or the fourth bin can be rearranged in different vertical locations and chutes, and may be configured to receive items of orders comprising multiple items. In some embodiments, chutes may be disposed about more than one side of the second modular item sorting machine 340.

The respective modules of the universal item sorter machine 320 may include one or more bins, or containers that hold items of a multi-item order. For example, as illustrated in side view 360, the second modular item sorting machine 340 may include a first chute 370, or vertical stacking, of bins, and a second chute 380 of bins. The bins in the respective chutes may be of different sizes or dimensions, or may be placed in different vertical locations along the chute. The universal item sorter machine 320 may include a plurality of bins disposed in an array along one or more sides of the first modular item sorting machine 330 and the second modular item sorting machine 340. The respective bins may be configured to be repositioned within different chutes and/or at different vertical locations. In FIG. 3, Bin 1 and Bin 2 may have the same height, while Bin 3 in the same column or chute may have a different height. Any suitable number of bins may be included in a chute and/or array.

Items or products inducted from the totes 310 may be sorted and directed to a bin associated with the order for which the item was picked. The items may be transported by one or more shuttles 350, which may move in one or more directions within the universal item sorter machine 320. In some embodiments, the shuttles 350 may be positioned outside of the universal item sorter machine 320. The shuttles 350 may include onboard conveyors that may be used to load and unload items from the shuttles 350. During transport, some items may fly off or otherwise fall off of the shuttles 350. In an example, Item 1 may be inducted from Tote 1 and placed in Bin 3, along with Item 989 and Item 34 from Tote 3645. Bin 3 may be associated with an order that included those three items, and may therefore be ready for packing. Similarly, Item 16 may be routed to Bin 4, Item 23 may be routed to Bin 5, Item 145 may be routed to Bin 6, and so forth. Any number of bins, totes, and/or modules may be included.

Figure 4:
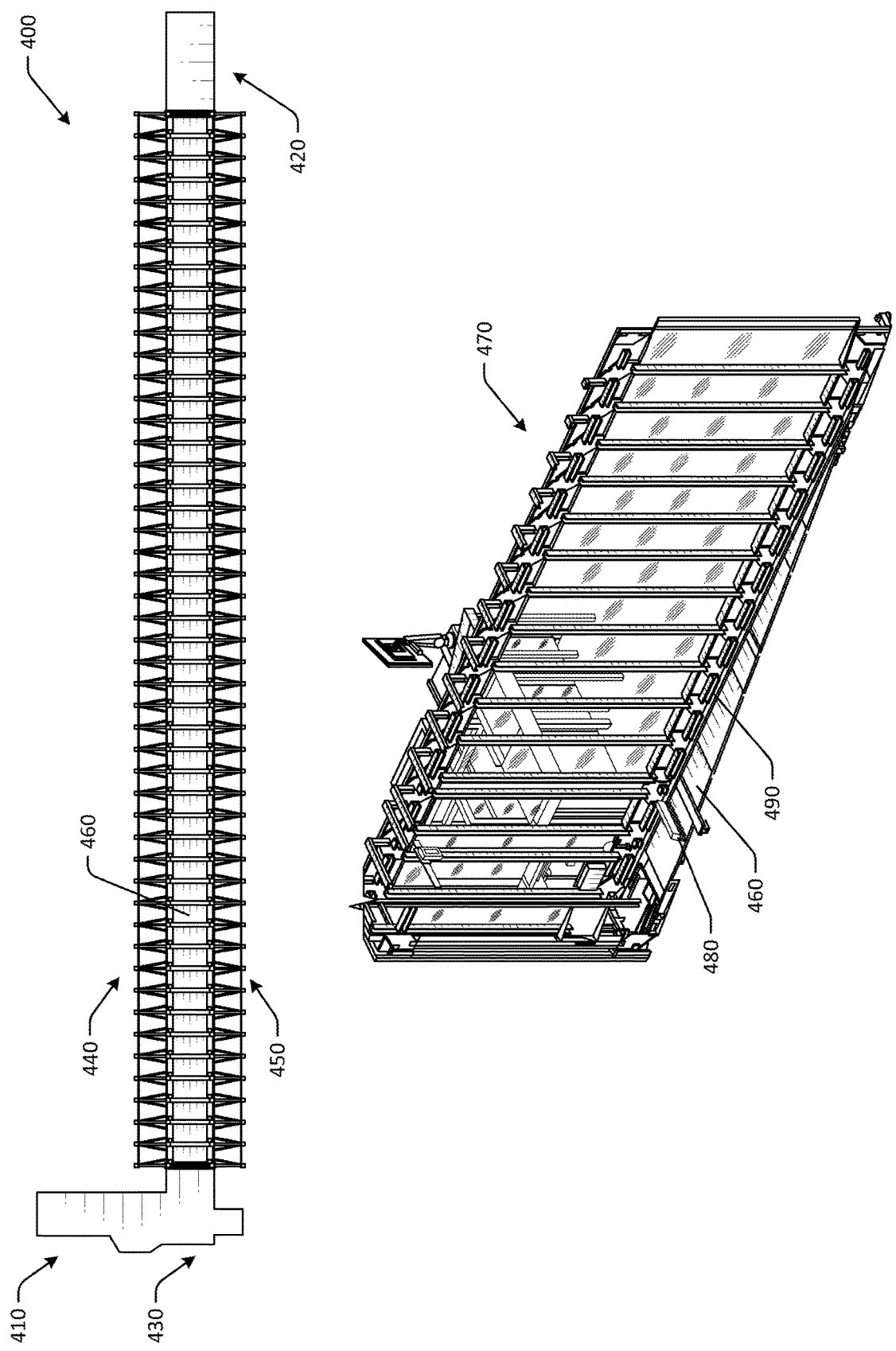
FIG. 4 is a schematic illustration of a top view and perspective cross-sectional view of an item sortation system with a camera-based tracking system in accordance with one or more embodiments of the disclosure.

FIG. 4 is a schematic illustration of a top view and perspective cross-sectional view of an item sortation system 400 with a camera-based tracking system in accordance with one or more embodiments of the disclosure. Other embodiments may include additional or fewer components. The illustration of FIG. 4 may not be to scale, and may not be illustrated to scale with respect to other figures. The item sortation system illustrated in FIG. 4 may be the same universal item sorter discussed with respect to FIGS. 1-3.

In FIG. 4, the item sortation system 400 may include an induction portion 410, where items may be inducted from totes that are routed to the item sortation system 400. The item sortation system 400 may be a universal item sorter. The item sortation system 400 may include a first set of chutes 440 on a first side of the item sortation system 400, and a second set of chutes 450 on a second side of the item sortation system 500. An aisle 460 may be disposed between the first set of chutes 440 and the second set of chutes 450. The chutes may be vertical columns formed along the respective sides. One or more of the chutes may lead to one or more bins positioned at various vertical positions along the chute. The bins may be removable from the chute in some instances, and may not be removable in other instances. The bins may be of different sizes to accommodate different numbers of items and/or items of different sizes.

The item sortation system 400 may include an automated sweeper that may be configured to sweep the aisle 460 of the item sortation system 400 to push any items on the floor of the aisle 460 to an end of the item sortation system 400, such as a first end 430 adjacent to the induction portion 410 or a second end 420 at a distal end of the item sortation system 400. The automated sweeper may push the items into a removable container disposed at either or both the first end 430 and the second end 420 of the item sortation system 400 for removal.

As depicted in a perspective cross-sectional view, the item sortation system 400 may include a robotic sweeping system 480 that may be configured to automatically sweep a floor of the aisle 460, so as to push any items on the floor to either end of the aisle 460. The robotic sweeping system 480 may be configured to move along one or more tracks 490 that may be disposed adjacent to a lower portion of the item sortation system 400, such that a portion of the robotic sweeping system 480 contacts the floor during movement. The tracks 490 may be tracks along with shuttles of the item sortation system 400 move (e.g., existing tracks), or may be tracks designated for the robotic sweeping system 480 (e.g., existing tracks or retrofitted tracks, etc.). In some embodiments, the tracks 490 may be coupled to a charging rail or may otherwise provide power to recharge a capacitor or battery disposed at the robotic sweeping system 480.

The item sortation system 400 may include one or more cameras 470 disposed overhead or otherwise positioned such that shuttles and/or items being sorted by the item sortation system 400 are within a field of view of the one or more cameras 470. The cameras 470 may be wireless cameras and may be configured to send image and/or video data to a computer system or controller. In one example, the cameras 470 may be configured to facilitate and/or implement machine learning, and may include one or more untrained or pre-trained model. Some cameras may be configured to implement deep learning or other machine learning techniques that use neural networks to learn and make predictions through computer vision. Data from the cameras 470 may be used to update inventory, track items and/or shuttles, send shuttle speed and/or conveyor adjustment notifications, detect maintenance issues, and so forth.

Accordingly, the item sortation system 400 may include the induction portion 410 at which first items for sortation are inducted into the item sortation system 400, and may include the aisle 460 that is disposed about a center of the item sortation system 400 or otherwise between two sets of chutes. The item sortation system 400 may include a first plurality of chutes disposed along a first side of the aisle 460, and a second plurality of chutes disposed along a second side of the aisle 460. The item sortation system 400 may include one or more shuttles that include conveyor belts, where the shuttles are configured to transport the first items from the induction portion 410 to a chute of the first plurality of chutes or the second plurality of chutes. The item sortation system 400 may include the robotic sweeping system 480 disposed in the aisle 460 and configured to sweep second items on a floor of the aisle 460 to the first end 430 or the second end 420 of the item sortation system 400. The robotic sweeping system 480 may include a motor, a sweeping device such as a flexible material (e.g., rubber, brush bristles, etc.), a capacitor, battery, or other power source, an optional controller, and/or other components.

The item sortation system 400 may include a first removable pan disposed at the first end 430 of the item sortation system 400, where the first removable pan is positioned relatively lower than the floor of the aisle 460. The item sortation system 400 may include a first access door disposed adjacent to the first removable pan, the first access door having a first opening through which the first removable pan is accessible. The robotic sweeping system 480 may be configured to sweep the second items into the first removable pan.

In some embodiments, the item sortation system 400 may include a second removable pan disposed at the second end 420 of the aisle 460, where the second removable pan is positioned relatively lower than the floor of the aisle 460. The item sortation system 400 may include a second access door disposed adjacent to the second removable pan, the second access door having a second opening through which the second removable pan is accessible. The robotic sweeping system 480 may be configured to sweep third items into the second removable pan. The sweeping device of the robotic sweeping system 480 may include one or more of: a rubber flap or one or more bristles, and the sweeping device may be configured to rotate from a vertical position to a horizontal position in some embodiments, such as embodiments where a removable pan is disposed at one end of the item sortation system 400. In such embodiments, the sweeping device may be rotated to a horizontal position or retracted into a housing of the robotic sweeping system 480 while the robotic sweeping system 480 moves to an opposite end of the aisle 460, after which the sweeping device can be positioned in the vertical position or extended so as to sweep the floor of the aisle 460. As a result, sweeping may occur in a single direction. The tracks 490 may be a charging rail where a capacitor of the robotic sweeping system 480 may be charged by the charging rail. The robotic sweeping system 480 may have a home position at the first end 430 of the item sortation system 400 or the second end 420 in some embodiments.

Figure 5:
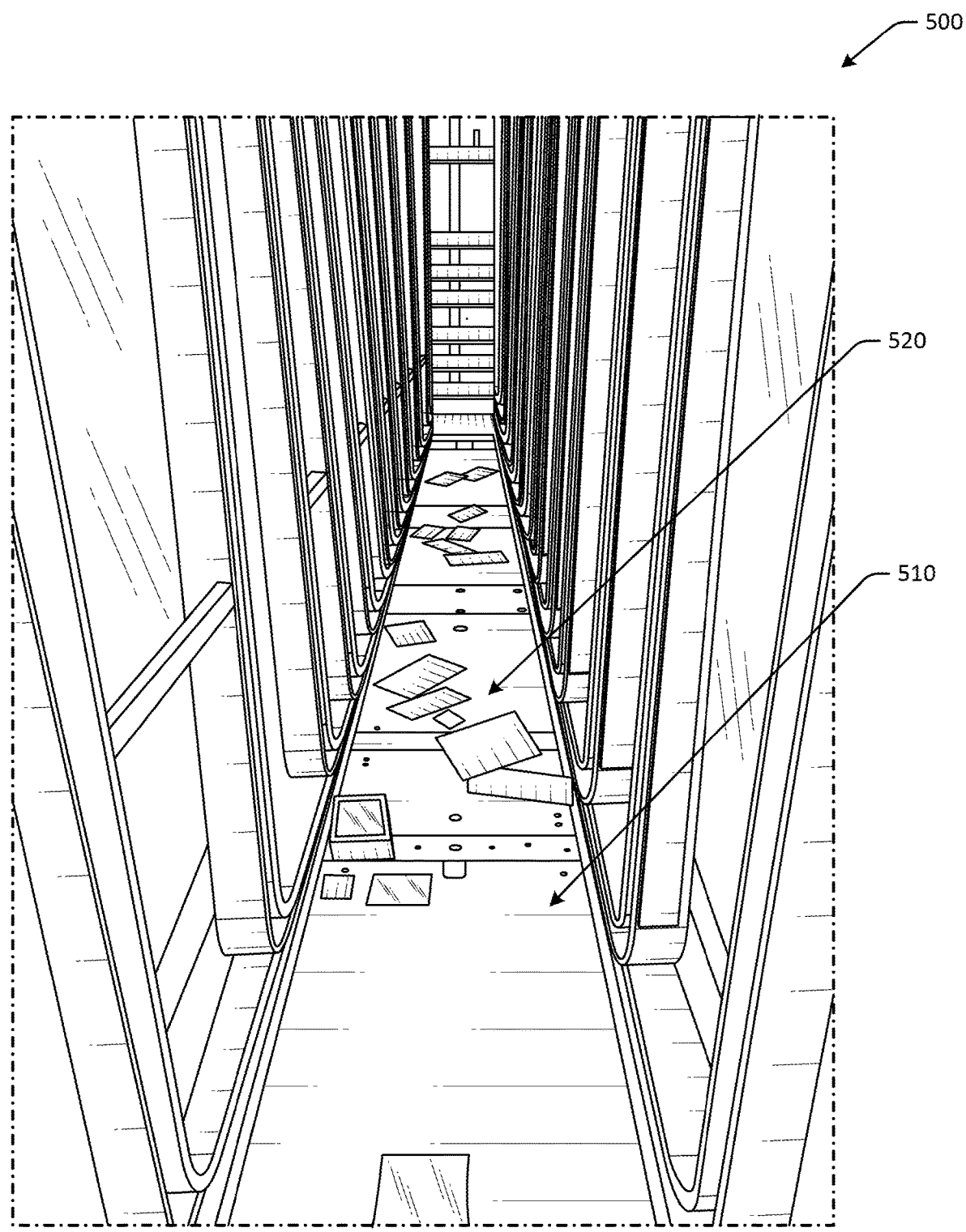
FIG. 5 is a schematic illustration of an aisle of an item sortation system in accordance with one or more embodiments of the disclosure.

FIG. 5 is a schematic illustration of an aisle 500 of an item sortation system in accordance with one or more embodiments of the disclosure. In FIG. 5, the aisle 500 is depicted with various items 520 disposed about a floor 510 of the aisle 500. The aisle 500 may be an aisle of an item sortation system, such as a center aisle or a different aisle between sets of chutes disposed on opposite sides of the aisle 500. Shuttles may be used to transport items through the aisle 500 to a particular chute, but in some instances, items 520 may fall off of the shuttles and onto the floor 510 of the aisle 500. The robotic sweeping systems or automated sweepers described herein may be used to clear the aisle 500 of the items 520. After a threshold amount of items are determined to be on the floor using the camera system as described in FIG. 4, the automated sweeper may be triggered to sweep the items 520 to an end of the item sortation system.

Figure 6:
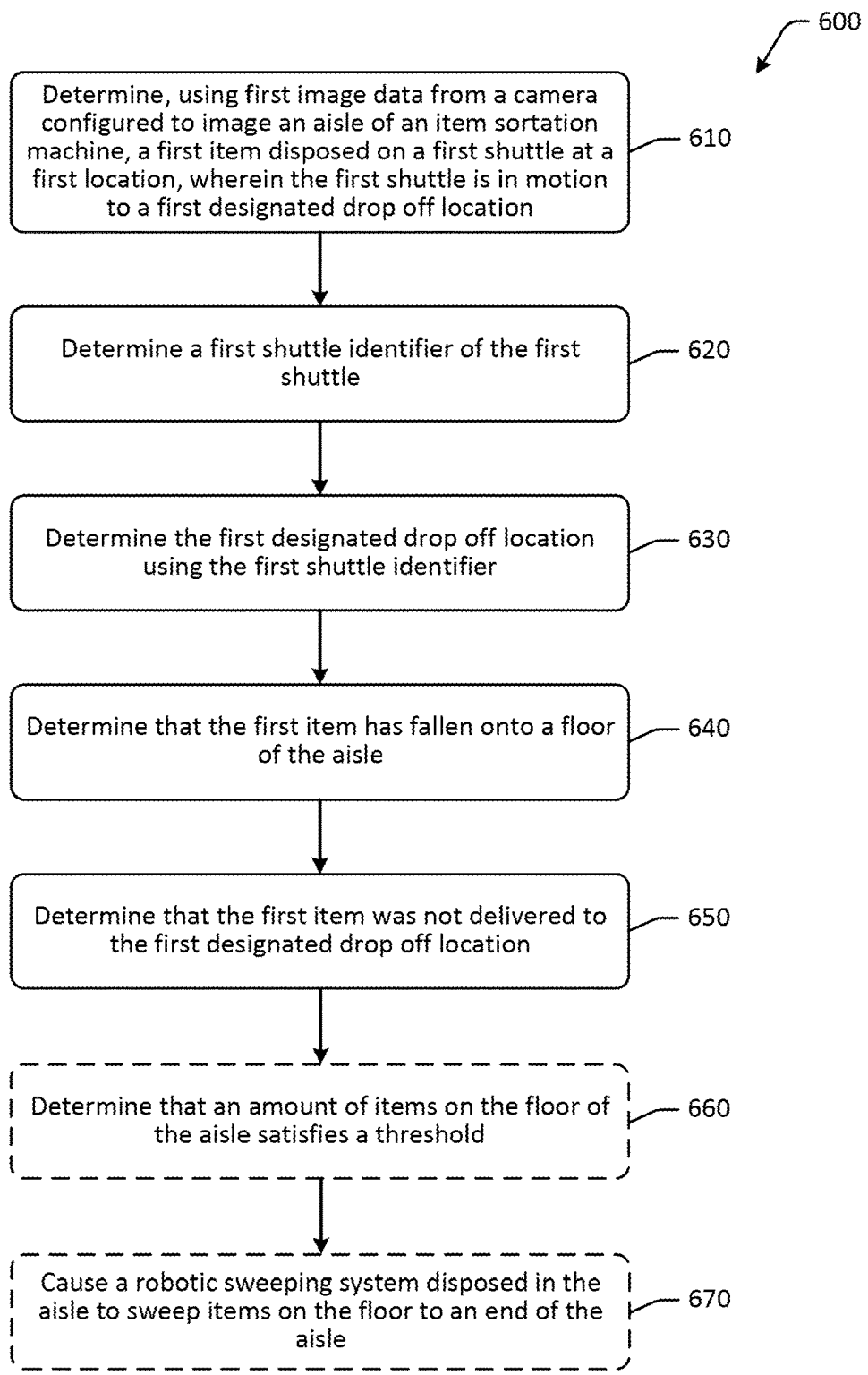
FIG. 6 is a schematic illustration of an example process flow for camera-based tracking in accordance with one or more example embodiments of the disclosure.

FIG. 6 depicts an example process flow 600 for camera-based tracking in accordance with one or more example embodiments of the disclosure. While example embodiments of the disclosure may be described in the context of tracking items and shuttles in an aisle of an item sortation system, it should be appreciated that the disclosure is more broadly applicable to any type of item sortation. Some or all of the blocks of the process flows in this disclosure may be performed in a distributed manner across any number of devices. The operations of the process flow 600 may be optional and may be performed in a different order.

At block 610 of the process flow 600, computer-executable instructions stored on a memory of a device, such as a remote server or a controller, may be executed to determine, using first image data from a camera configured to image an aisle of the item sortation machine, a first item disposed on a first shuttle at a first location, where the first shuttle is in motion to a first designated drop off location. For example, an item/shuttle tracking engine and/or one or more item/shuttle tracking modules at a controller may determine a first item disposed on a first shuttle at a first location using first image data from one or more cameras configured to image an aisle of the item sortation machine. The items may be disposed on shuttles that move about the aisle and deliver or drop off the item(s) at designated drop off locations, such as a particular chute or container. The controller may be configured to process the image data using one or more image processing algorithms and/or machine learning algorithms to identify the first item. The controller may determine a location of the shuttle in the image at which the item is determined. For example, a location may be determined relative to the aisle, relative to an induction portion, relative to an adjacent chute, or relative to another landmark. The controller may determine a timestamp associated with the shuttle and the location. The first image data may be used to determine whether the first item is on track to be delivered at its designated destination and/or whether the first item has fallen off the shuttle.

At block 620 of the process flow 600, computer-executable instructions stored on a memory of a device, such as a remote server or a controller, may be executed to determine a first shuttle identifier of the first shuttle. For example, the item/shuttle tracking engine and/or one or more item/shuttle tracking modules at a controller may determine a first shuttle identifier of the first shuttle. The first shuttle identifier may be determined based at least in part on a barcode, a Quick Read code, or other machine-readable code that may be determined using image data. Analysis of images may include processing images using one or more barcode recognition algorithms, determining pixel color values, comparing certain portions of images to previous or subsequent images or frames in video, and the like.

At block 630 of the process flow 600, computer-executable instructions stored on a memory of a device, such as a remote server or a controller, may be executed to determine the first designated drop off location using the first shuttle identifier. For example, the item/shuttle tracking engine and/or one or more item/shuttle tracking modules at a controller may determine the first designated drop off location using the first shuttle identifier. The first shuttle identifier may be associated with the first designated drop off location. For example, the item sortation system may determine a destination for the shuttle based on the item on the shuttle, or to be loaded on the shuttle, and the corresponding order for which the item is a part of (e.g., the container in which the items for the particular order are being aggregated, etc.). To determine the first designated drop off location, the controller may query a computer system associated with the item sortation system, or may otherwise receive the first designated drop off location from the item sortation system.

At block 640 of the process flow 600, computer-executable instructions stored on a memory of a device, such as a remote server or a controller, may be executed to determine that the first item has fallen onto a floor of the aisle. For example, the item/shuttle tracking engine and/or one or more item/shuttle tracking modules at a controller may determine that the first item has fallen onto a floor of the aisle. The controller may determine that the first item has fallen onto a floor of the aisle based at least in part on analysis of one or more images. For example, by analyzing subsequent, consecutive, or non-consecutive frames in a video of the shuttle, the controller may determine that the first item is no longer on the shuttle. In some embodiments, the controller may further determine that the first item is on the floor of the aisle based at least in part on one or more images of the floor captured by the camera system.

At block 650 of the process flow 600, computer-executable instructions stored on a memory of a device, such as a remote server or a controller, may be executed to determine that the first item was not delivered to the first designated drop off location. For example, the item/shuttle tracking engine and/or one or more item/shuttle tracking modules at a controller may determine that the first item was not delivered to the first designated drop off location. In some embodiments, the controller may determine that the first item was not delivered to the first designated drop off location as a result of determining that the first item has fallen onto a floor of the aisle. In other embodiments, the controller may determine that the first item was not delivered to the first designated drop off location because the first item was not delivered to the correct location, was not fully offloaded from the shuttle, or otherwise was not delivered to the first designated drop off location using computer vision and image processing techniques.

At optional block 660 of the process flow 600, computer-executable instructions stored on a memory of a device, such as a remote server or a controller, may be executed to determine that an amount of items on the floor of the aisle satisfies a threshold. For example, the item/shuttle tracking engine and/or one or more item/shuttle tracking modules at a controller may determine that an amount of items on the floor of the aisle satisfies a threshold. The amount of items may be determined based at least in part on image data captured of the floor of the aisle. The amount of items may be determined as a certain number of items (e.g., each time an item falls after a sweeping event, a digital counter may be incremented, etc.), a certain volume of items (e.g., a sum of the volume of each of the items in the aisle, etc.), a certain amount of occupied floor space, etc. The amount of items may be compared to a threshold that may correspond to the units of the amount. For example, a threshold may be 15 items have fallen to the floor, or 5% of floor space is occupied, and so forth. The determined amount may be compared to the threshold to determine whether the amount meets or exceeds the corresponding configurable threshold.

At optional block 670 of the process flow 600, computer-executable instructions stored on a memory of a device, such as a remote server or a controller, may be executed to cause a robotic sweeping system disposed in the aisle to sweep items on the floor to an end of the aisle. For example, the item/shuttle tracking engine and/or one or more item/shuttle tracking modules at a controller may cause a robotic sweeping system disposed in the aisle to sweep items on the floor to an end of the aisle. The robotic sweeping system may sweep the fallen items from the floor of the aisle. The items may then be retrieved and sorted into the corresponding containers as needed, or may be returned to inventory.

Figure 7:
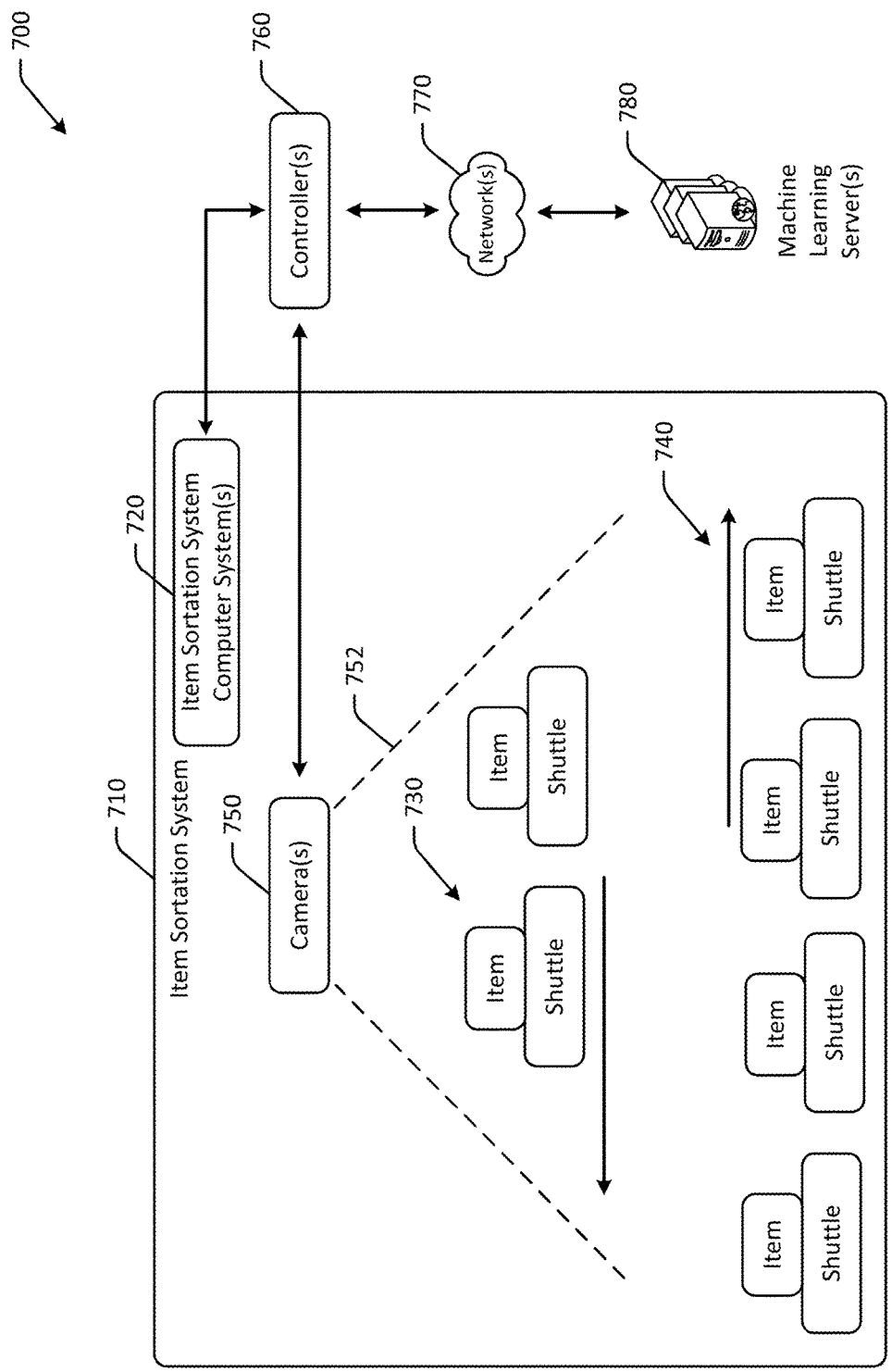
FIG. 7 is a schematic illustration of an item sortation system and camera-based tracking system in accordance with one or more embodiments of the disclosure.

FIG. 7 is a schematic illustration of an item sortation system and camera-based tracking system 700 in accordance with one or more embodiments of the disclosure. Other embodiments may include additional or fewer components. The illustration of FIG. 7 may not be to scale, and may not be illustrated to scale with respect to other figures. The item sortation system illustrated in FIG. 7 may be the same universal item sorter discussed with respect to FIGS. 1-6.

In FIG. 7, the item sortation system and camera-based tracking system 700 may include an item sortation system 710 having an item sortation system controller or computer system 720. The item sortation system computer system 720 may be configured to control one or more aspects of the item sortation system 710, such as shuttle movement. The item sortation system 710 may include one or more rows of shuttles 730, 740 with items on top. The shuttles 730, 740 may transport the items to designated drop off locations.

One or more cameras 750 may be coupled to the item sortation system 710. For example, the cameras 750 may be disposed overhead an aisle of the item sortation system 710. The shuttles 730, 740 may move laterally and vertically in the aisle, and may move across a number of rows or columns. The shuttles 730, 740 may be within a field of view 752 of the one or more cameras 750. Accordingly, the one or more cameras may image the shuttles 730, 740 as the shuttles 730, 740 move within the item sortation system 710.

The cameras 750 may be part of a camera-based tracking system that includes one or more controllers 760. The controller 760 may be a standalone controller or may be integrated into the item sortation system computer system 720. The controller 760 may use the cameras 750 to capture image data. The controller 760 may send the image data to one or more machine learning servers 780 for processing via one or more networks 770. The machine learning servers 780 may determine one or more outputs, such as whether an item fell off a shuttle, whether an automated sweeper system is to be triggered, and so forth, which may be sent as signals or commands to the controller 760. In some embodiments, the machine learning servers 780 may be local. The controller 760 may communicate with the item sortation system computer system 720 to perform one or more actions, such as update inventory, change shuttle parameters, and the like.

In one example, the camera-based tracking system may determine, using image data from the camera 750, an item disposed on a shuttle at a location, where the shuttle is in motion to a designated drop off location, and may determine a shuttle identifier of the shuttle. The camera-based tracking system may determine the designated drop off location using the shuttle identifier, and may determine that the item was delivered to the designated drop off location. The camera-based tracking system may therefore generate an inventory update for the designated drop off location indicating that the item was delivered, and if needed, the inventory update may modify a status of the item from undelivered to delivered or from delivered to undelivered as appropriate. In another example, the camera-based tracking system may determine that an amount of vibration of the shuttle is greater than a predetermined tolerance using image data, and may automatically generate a maintenance notification indicating the shuttle is due for service.

Figure 8:
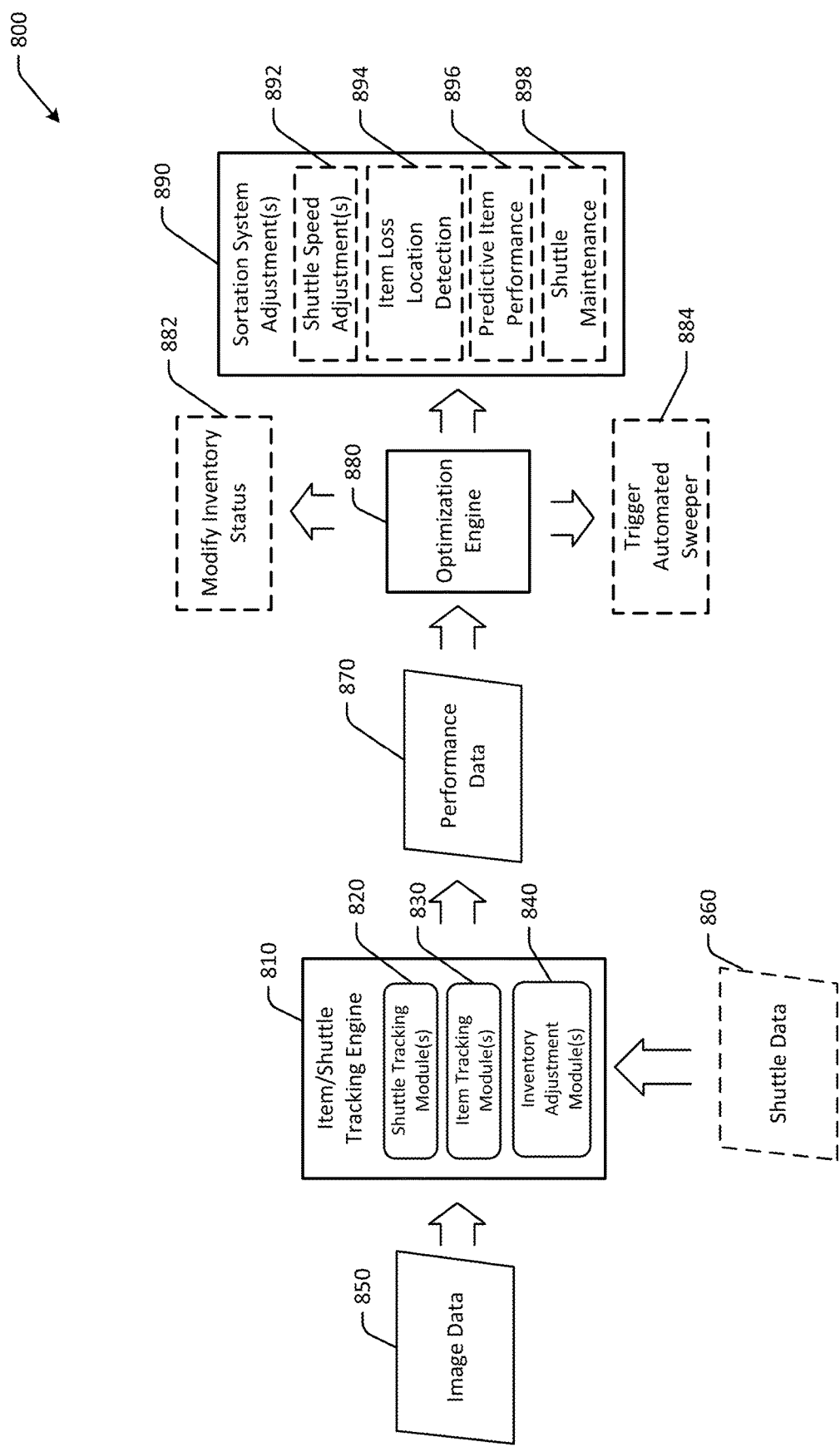
FIG. 8 is a schematic illustration of an example data and process flow for camera-based tracking of item sortation systems in accordance with one or more example embodiments of the disclosure.

FIG. 8 is a schematic illustration of an example data and process flow 800 for camera-based tracking of item sortation systems in accordance with one or more example embodiments of the disclosure. Different embodiments may include different, additional, or fewer inputs or outputs than those illustrated in the example of FIG. 8.

In FIG. 8, the example data and process flow 400 is schematically depicted. An item/shuttle tracking engine 810 and/or one or more item/shuttle tracking module(s) may be configured to detect or determine one or more items and/or shuttles, as well as additional features such as shuttle location in an item sortation system, item location on a shuttle conveyor, and/or other features. The item/shuttle tracking engine 810 may be stored at and/or executed by one or more remote servers. The item/shuttle tracking engine 810 may include one or more modules or algorithms, and may be configured to identify or determine the presence of items on shuttles and/or a floor of the item sortation system.

For example, the item/shuttle tracking engine 810 may include one or more shuttle tracking modules 820, one or more item tracking modules 830, and/or one or more inventory adjustment modules 840. Additional or fewer, or different, modules may be included. The shuttle tracking module(s) 820 may be configured to process and/or analyze image or video content to identify shuttles and/or determine shuttle identifiers. For example, the shuttle tracking module(s) 820 may be configured to determine frames or sets of frames of video content and may be configured to detect certain features, such as shuttles or shuttle barcodes or other identifiers. The shuttle tracking module(s) 820 may optionally be configured to detect or analyze frames in video content to determine frames in which a shuttle is present. For example, the shuttle tracking module(s) 820 may include object recognition and/or shuttle face detection algorithms that can be used to identify shuttles over frames or segments of the video content, which may not always be consecutive. Shuttle tracking module(s) 820 may include one or more object recognition algorithms configured to detect at least one of predefined objects, certain locations, and the like.

The item tracking module(s) 830 may be configured to process and/or analyze frames of video content to determine whether an item is present on a shuttle, and if so, where on the shuttle the item is present. In some instances, the item tracking module(s) 830 may be configured to generate a composite path of item movement on the shuttle during transport, which may be used to train a machine learning algorithm to generate predicted movement values. The item tracking module(s) 830 may be configured to perform an image comparison process to determine whether an item moves on the shuttle during transport.

The inventory adjustment module(s) 840 may be configured to modify inventory statuses at the item sortation system based at least in part on determinations of delivery made using data from the camera(s). The inventory adjustment module(s) 840 may be configured to perform an image-to-image analysis to determine whether an item was delivered, or whether the item fell on the floor or was otherwise not delivered. The inventory adjustment module(s) 840 may send status updates to the item sortation system.

The item/shuttle tracking engine 810 may receive one or more inputs that may be used to generate one or more outputs, such as performance data 870. For example, the item/shuttle tracking engine 810 may receive one or more of image data 850 associated with the images or video content captured by one or more cameras, and/or optional shuttle data 860, such as shuttle speed data, that may be associated with individual shuttles and may be received from shuttles or a computer system of the item sortation system. In some embodiments, the image data 850, shuttle data 860, and/or text data 470 may be received from different systems.

The item/shuttle tracking engine 810 may process the respective data associated with the items and the shuttles. For example, the image data 850 may be processed using one or more of the shuttle tracking module(s) 820 and/or the item tracking module(s) 830. Likewise, the shuttle data 860 may be processed using one or more of the modules or algorithms of the item/shuttle tracking engine 810.

Using one or more algorithms or modules, the item/shuttle tracking engine 810 may output performance data 870. The performance data 870 may represent whether or not a certain item was delivered, along with various data related to undelivered items, whether or not items fell on the floor of the aisle of the sortation system, an amount of items that fell on the floor, and so forth. The performance data 870 may be structured or unstructured data, and may or may not be sorted. The performance data 870 may include timestamps representing a point in time at which an item fell off a shuttle. The performance data 870 may include data related to whether certain items were delivered, where items fell off shuttles, whether items fell off shuttles, an amount of items on the floor of the aisle, and so forth.

The performance data 870 may be input at an optimization engine 880 and/or one or more optimization module(s). The optimization engine 880 may be configured to optimize one or more machine learning algorithms using the performance data 870, and to generate one or more optional outputs. For example, the optimization engine 880 may be configured to retrain a machine learning model, generate a training data set, and/or otherwise optimize one or more machine learning algorithms using the performance data 870.

The output of the optimization engine 880 may include one or more outputs. For example, the optimization engine 880 may output an action of modifying inventory status 882. Inventory status modification may include adjusting the status of delivered or undelivered items at a container of the sortation system. The optimization engine 880 may output an action of triggering an automated sweeper 884. For example, based at least in part on the performance data 870, the optimization engine 880 may determine that the threshold amount of items are on the floor, and the automated sweeper is to be activated. The optimization engine 880 may therefore send a signal to an automated sweeper system to sweep the floor. The optimization engine 880 may output one or more sortation system adjustments 890. Sortation system adjustments 890 may include one or more adjustments to sortation system parameters, and may be wirelessly communicated (or communicated using wired communication) to the item sortation system. Sortation system adjustments 890 may include shuttle speed adjustments 890, which may result in one or more shuttles decreasing speed for a certain amount of time, until an item is delivered, or until serviced, item loss location detection 894, which may correlate lost items to the locations at which the items fell off the shuttle, so as to determine whether there is a pattern or particular location at which items fall off the shuttles, predictive item performance 896, which may utilize machine learning to predict whether a certain item will fall off a shuttle based at least in part on dimensions and/or shape of the item (and if the likelihood is greater than a threshold, a shuttle speed adjustment command may be initiated, etc.), and/or shuttle maintenance 898, at which maintenance for a shuttle may be scheduled. For example, based at least in part on visually detectable vibrations, maintenance may be pre-emptively scheduled, so as to reduce a likelihood of unplanned downtime, etc.

Accordingly, the data from the cameras may be used to continually update one or more machine learning models, which in turn can be used to decrease loss of items, automatically trigger automated sweeping, and improve inventory accuracy.

Figure 9:
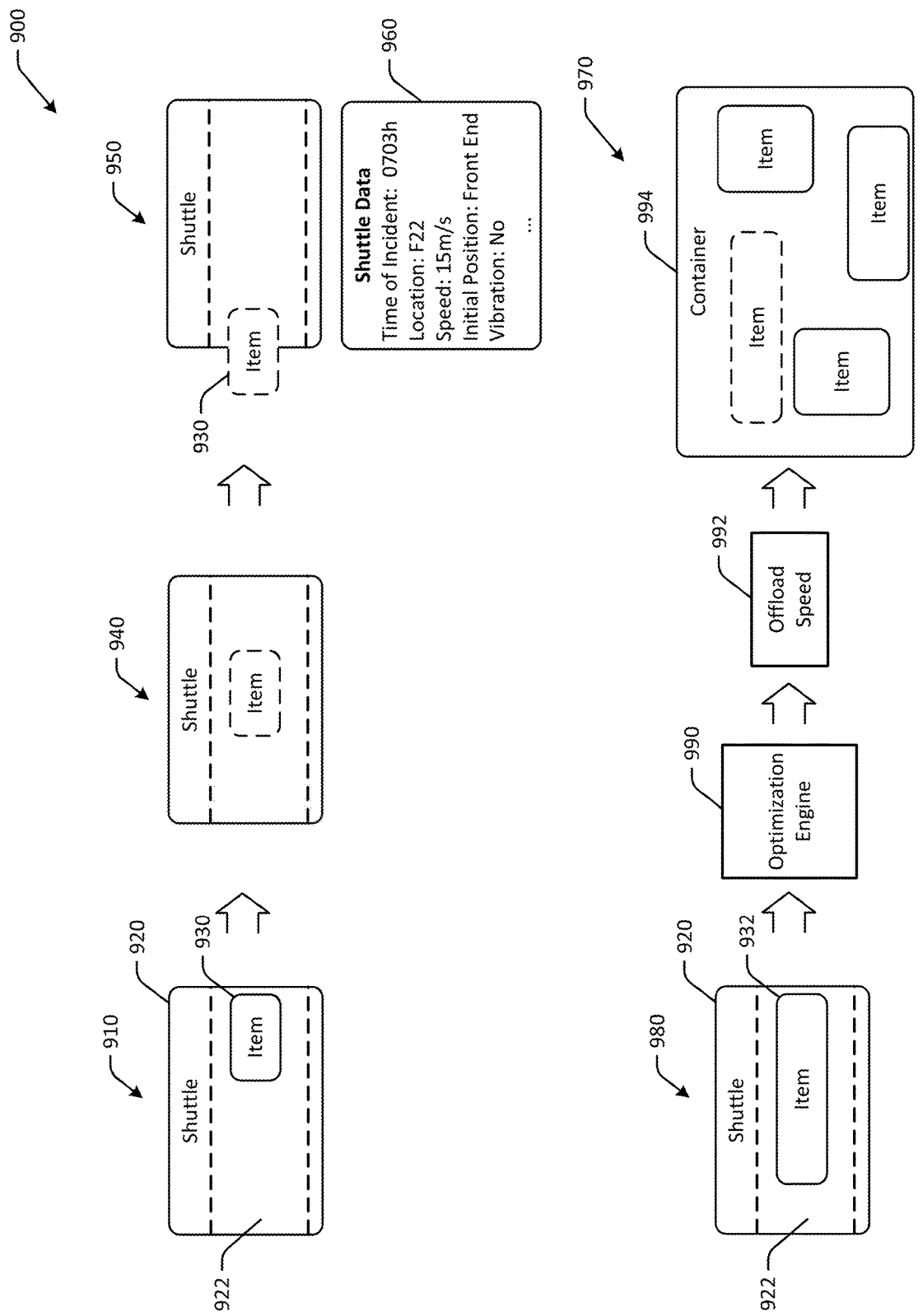
FIG. 9 is a schematic illustration of item movement detection and conveyor speed adjustment determination in accordance with one or more example embodiments of the disclosure.

FIG. 9 is a schematic illustration of item movement detection and conveyor speed adjustment determination 900 in accordance with one or more example embodiments of the disclosure. While example embodiments of the disclosure may be described in the context of tracking items and shuttles in an aisle of an item sortation system, it should be appreciated that the disclosure is more broadly applicable to any type of item sortation. Some or all of the blocks of the process flows in this disclosure may be performed in a distributed manner across any number of devices. The operations of the process flow 1000 may be optional and may be performed in a different order.

In FIG. 9, at a first instance 910, a shuttle 920 may be transporting an item 930 to a designated drop off location. The item 930 may be positioned on a conveyor 922 of the shuttle 920. The shuttle 920 may use the conveyor 922 to onboard and/or offload the item 930. As the shuttle 920 moves throughout an item sortation system, the item 930 may move on the conveyor 922. For example, at a second instance 940, the item 930 may have moved from a front end of the shuttle 920 to a middle portion of the conveyor. At a third instance 950, the item 930 may fall off the conveyor 922 during transport. Some items may be more susceptible to falling off the shuttle 920 than others, such as round items. The position of the item on the conveyor 922 may be determined using one or more cameras that may image the shuttle 920 as the shuttle 920 moves. Based at least in part on data from the camera(s), a controller or other computer system may determine shuttle data 960 that can be used to improve subsequent delivery of items. For example, the shuttle data 960 may include information related to the item 930 that fell off the conveyor 922. The shuttle data 960 may include a timestamp at which the item fell off, a location of the shuttle at which the item fell off, a speed of the shuttle at the time that the item fell off, and initial positon of the item when it was loaded, an indication as to whether or not the shuttle was vibrating, and/or other data. The shuttle data 960 may be input at one or more machine learning algorithms and used to determine which parameters, if any, can be adjusted to reduce items falling off the shuttle for subsequent deliveries.

Accordingly, in one embodiment, the controller may determine that the item 930 moved from a first position to a second position on the shuttle 920 or the conveyor 922, and may determine a location of the shuttle 920 at which the item 930 moved. The controller may determine a speed of the shuttle 920 at the location, and may update a machine learning dataset for a machine learning algorithm using the shuttle data 960, which may include the location and the speed data. In another example, the controller may determine that a distance between the first position and the second position is greater than a movement threshold, and may generate a notification indicating that shuttle speed is to be reduced at the location, so as to prevent the item from moving too much as the shuttle passes the location.

The controller may be further configured to modify a conveyor speed of the conveyor 922 in order to cause the item 930 to be thrown off the shuttle 920 into a particular location. For example, in schematic illustration 970 of FIG. 9, at a first instance 980, an item 932 may be disposed on a conveyor 922 of the shuttle 920. The position of the item 932 may be determined using one or more cameras by the optimization engine 990. The optimization engine 990 may output an offload speed 992, which may be a speed at which the conveyor 922 is to move to offload the item 932 into a container 994.

The optimization engine 990 may determine the offload speed 992 based at least in part available space in the container 994 (which may be determined using the same camera system in the aisle of the item sortation system or a different camera system disposed outside the aisle of the item sortation system. The optimization engine 990 may also determine the offload speed 992 based at least in part on one or more of a size, weight, or shape of the item 932. In the example of FIG. 9, the item 932 may have a shape that fits into available space in the container 994. The optimization engine 990 may send offload speed data to the item sortation system and/or the shuttle 920 to implement the offload speed 992.

In one embodiment, the controller may determine the item 932 disposed on the shuttle 920, and may determine one or more of: a size, a weight, or a shape of the item 932 using image data. The controller may determine, based at least in part on the size, weight, or shape, a conveyor speed at which the conveyor 922 of the shuttle 920 is to offload the item 932 at a designated drop off location. In some instances, the controller may determine an arrangement of contents in the container 994 at the designated drop off location, and may determine the conveyor speed based at least in part on the arrangement of contents and the size, weight, or shape. Accordingly, overfilling of containers may be avoided.

Figure 10:
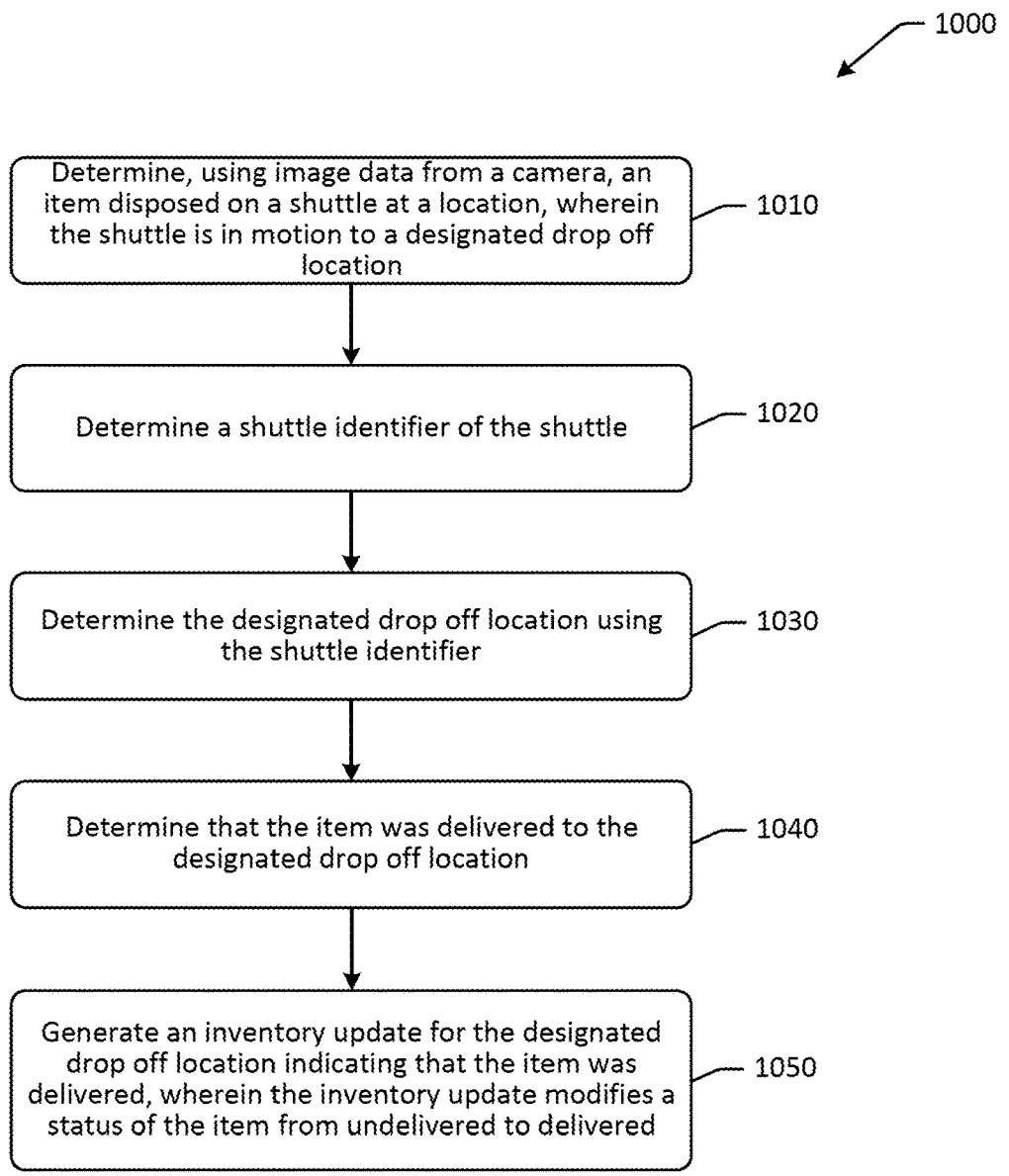
FIG. 10 is a schematic illustration of an example process flow for camera-based tracking and inventory management in accordance with one or more example embodiments of the disclosure.

FIG. 10 depicts an example process flow 1000 for camera-based tracking and inventory management in accordance with one or more example embodiments of the disclosure. While example embodiments of the disclosure may be described in the context of tracking items and shuttles in an aisle of an item sortation system, it should be appreciated that the disclosure is more broadly applicable to any type of item sortation. Some or all of the blocks of the process flows in this disclosure may be performed in a distributed manner across any number of devices. The operations of the process flow 1000 may be optional and may be performed in a different order.

The process flow 1000 may be executed to provide improved inventory management and/or item tracking, as incorrect item delivery statuses may be avoided and/or corrected as a result of the image processing and/or machine learning operations and other functionality described with respect to FIG. 10.

At block 1010 of the process flow 1000, computer-executable instructions stored on a memory of a device, such as a remote server or a controller, may be executed to determine, using image data from one or more cameras, an item disposed on a shuttle at a location, where the shuttle is in motion to a designated drop off location. For example, an item/shuttle tracking engine and/or one or more item/shuttle tracking modules at a controller may determine, using image data from one or more cameras, an item disposed on a shuttle at a location, where the shuttle is in motion to a designated drop off location. The item may be disposed on a shuttle that moves about the aisle and delivers or drops off the item(s) at a designated drop off location, such as a particular chute or container. The controller may be configured to process the image data using one or more image processing algorithms and/or machine learning algorithms to identify the first item. The controller may determine a location of the shuttle in the image at which the item is determined. For example, a location may be determined relative to the aisle, relative to an induction portion, relative to an adjacent chute, or relative to another landmark. The controller may determine a timestamp associated with the shuttle and the location. The image data may be used to determine whether the item is on track to be delivered at its designated destination and/or whether the first item has fallen off the shuttle.

At block 1020 of the process flow 1000, computer-executable instructions stored on a memory of a device, such as a remote server or a controller, may be executed to determine a shuttle identifier of the second shuttle. For example, the item/shuttle tracking engine and/or one or more item/shuttle tracking modules at a controller may determine a shuttle identifier of the second shuttle. The shuttle identifier may be determined based at least in part on a barcode, a Quick Read code, or other machine-readable code that may be determined using image data. Analysis of images may include processing images using one or more barcode recognition algorithms, determining pixel color values, comparing certain portions of images to previous or subsequent images or frames in video, and the like.

At block 1030 of the process flow 1000, computer-executable instructions stored on a memory of a device, such as a remote server or a controller, may be executed to determine the designated drop off location using the shuttle identifier. For example, the item/shuttle tracking engine and/or one or more item/shuttle tracking modules at a controller may determine the designated drop off location using the shuttle identifier. The shuttle identifier may be associated with the designated drop off location. For example, the item sortation system may determine a destination for the shuttle based on the item on the shuttle, or to be loaded on the shuttle, and the corresponding order for which the item is a part of (e.g., the container in which the items for the particular order are being aggregated, etc.). To determine the designated drop off location, the controller may query a computer system associated with the item sortation system, or may otherwise receive the designated drop off location from the item sortation system.

At block 1040 of the process flow 1000, computer-executable instructions stored on a memory of a device, such as a remote server or a controller, may be executed to determine that the item was delivered to the designated drop off location. For example, the item/shuttle tracking engine and/or one or more item/shuttle tracking modules at a controller may determine that the item was delivered to the designated drop off location. To determine whether the item was delivered to the designated drop off location, video and/or images of the item on the shuttle may be used to determine whether the item was deposited into the designated chute and/or container. In instances where the item falls off the shuttle or otherwise is not delivered to the correct chute and/or container, the controller may preemptively determine that the item was not delivered to the designated drop off location without having to wait for the shuttle to arrive at the designated drop off location.

At block 1050 of the process flow 1000, computer-executable instructions stored on a memory of a device, such as a remote server or a controller, may be executed to generate an inventory update for the designated drop off location indicating that the item was delivered, wherein the inventory update modifies a status of the item from undelivered to delivered. For example, the item/shuttle tracking engine and/or one or more item/shuttle tracking modules at a controller may generate an inventory update for the designated drop off location indicating that the item was delivered, wherein the inventory update modifies a status of the item from undelivered to delivered. In some embodiments, the item sortation system may not detect or otherwise determine that the item on the shuttle fell off the shuttle or was otherwise not delivered to the designated drop off location. Accordingly, the item sortation system may incorrectly determine that the item was delivered. To correct this status, the controller may generate an inventory update for the designated drop off location indicating that the item was not delivered. The inventory update may be sent to the item sortation system to update the status of the item (e.g., from delivered to undelivered, etc.). In another example, the item sortation system may incorrectly determine that the item was not delivered (e.g., inadvertently determining that the item was not offloaded from the shuttle, etc.). However, the controller may determine that the item was delivered using data from the cameras. To correct this status, the controller may generate an inventory update for the designated drop off location indicating that the item was delivered. The inventory update may be sent to the item sortation system to update the status of the item (e.g., from undelivered to delivered, etc.). Accordingly, accuracy of inventory management and tracking may be improved.

Figure 11:
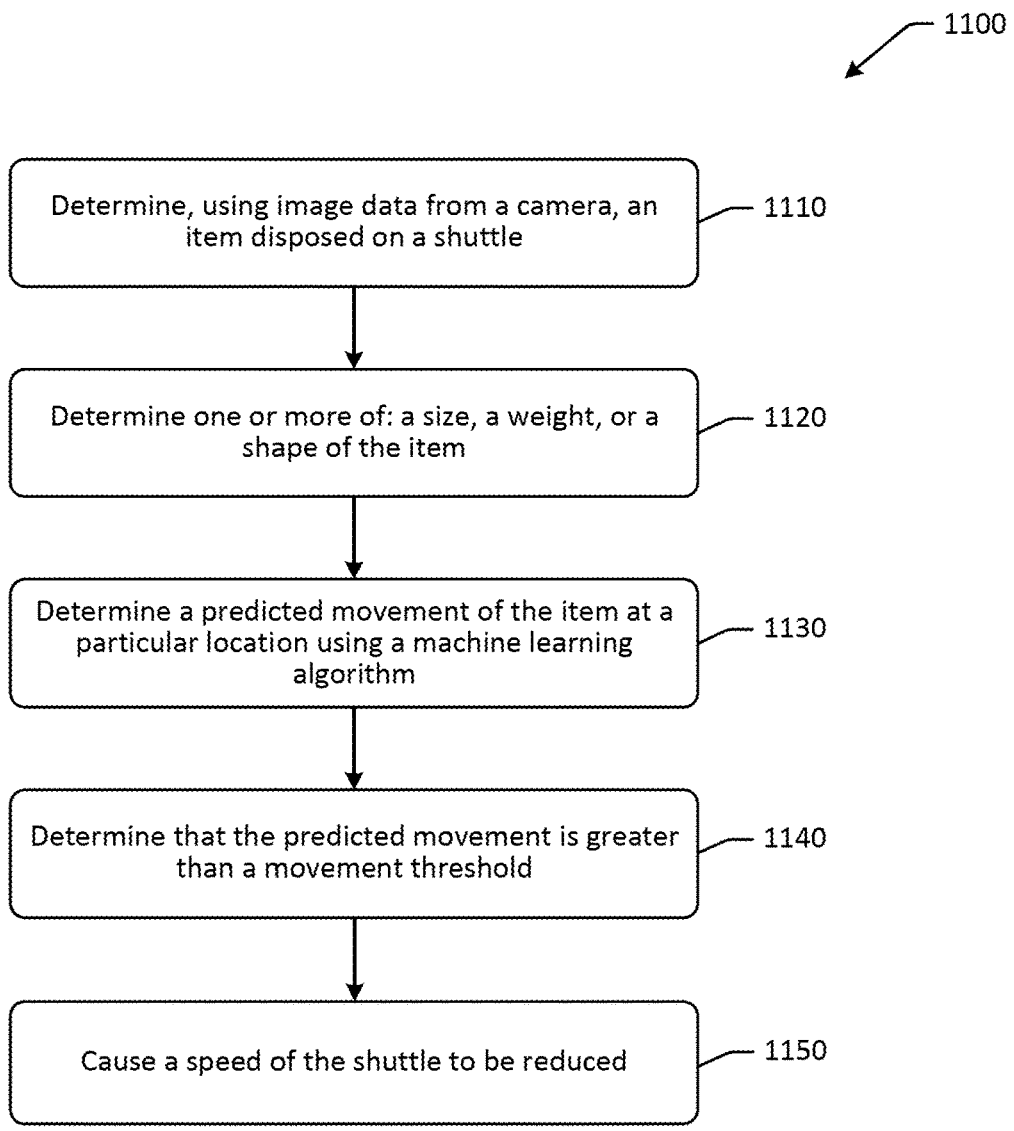
FIG. 11 is a schematic illustration of an example process flow for predicted item movement in accordance with one or more example embodiments of the disclosure.

FIG. 11 depicts an example process flow 1100 for predicted item movement in accordance with one or more example embodiments of the disclosure. While example embodiments of the disclosure may be described in the context of tracking items and shuttles in an aisle of an item sortation system, it should be appreciated that the disclosure is more broadly applicable to any type of item sortation. Some or all of the blocks of the process flows in this disclosure may be performed in a distributed manner across any number of devices. The operations of the process flow 1100 may be optional and may be performed in a different order.

The process flow 1100 may be executed to provide automated adjustments to various item sortation system parameters, such as shuttle speed, to reduce the likelihood of failed deliveries, incorrect deliveries, and/or unscheduled maintenance as a result of the image processing and/or machine learning operations and other functionality described with respect to FIG. 11.

At block 1110 of the process flow 1000, computer-executable instructions stored on a memory of a device, such as a remote server or a controller, may be executed to determine, using image data from a camera, an item disposed on a shuttle. For example, an item/shuttle tracking engine and/or one or more item/shuttle tracking modules at a controller may determine, using image data from a camera, an item disposed on a shuttle. The item may be disposed on a shuttle that moves about the aisle and delivers or drops off the item(s) at a designated drop off location, such as a particular chute or container. The controller may be configured to process the image data using one or more image processing algorithms and/or machine learning algorithms to identify the first item. The controller may determine a location of the shuttle in the image at which the item is determined. For example, a location may be determined relative to the aisle, relative to an induction portion, relative to an adjacent chute, or relative to another landmark. The controller may determine a timestamp associated with the shuttle and the location. The image data may be used to determine whether the item is on track to be delivered at its designated destination and/or whether the first item has fallen off the shuttle. In some embodiments, the controller may identify the item disposed on the shuttle via computer vision (e.g., image processing, etc.), barcode scanning, querying the item sortation system, etc.

At block 1120 of the process flow 1000, computer-executable instructions stored on a memory of a device, such as a remote server or a controller, may be executed to determine one or more of: a size, a weight, or a shape of the item. For example, an item/shuttle tracking engine and/or one or more item/shuttle tracking modules at a controller may determine one or more of: a size, a weight, or a shape of the item based at least in part on an item identifier associated with the item and/or based at least in part on image processing of one or more images of the item. For example, dimensions and/or shape of the item may be determined using an image of the item. In another example, dimensions and/or shape data may be predetermined and associated with an item identifier of the item, and can therefore be determined using a database, where the dimensions and/or shape data is associated with the item identifier.

At block 1130 of the process flow 1000, computer-executable instructions stored on a memory of a device, such as a remote server or a controller, may be executed to determine a predicted movement of the item at a particular location using a machine learning algorithm. For example, an item/shuttle tracking engine and/or one or more item/shuttle tracking modules at a controller may determine a predicted movement of the item at a particular location using a machine learning algorithm. For example, over time, images of different items on shuttles at different locations within the item sortation system, as well as different locations on a conveyor of a shuttle, may be captured and used to train a machine learning algorithm, along with data regarding whether or not the item was present on the shuttle at a particular location. The machine learning algorithm may be configured to output predictions related to how much an item may move on a shuttle at a particular location within the item sortation system (e.g., around a bend, etc.) based at least in part on the shape and/or dimensions of the item, the positioning of the item on the conveyor of the shuttle, the speed of the shuttle, and/or other factors. The controller may use the machine learning algorithm to determine a predicted movement of the item at a particular location within the item sortation system.

At block 1140 of the process flow 1000, computer-executable instructions stored on a memory of a device, such as a remote server or a controller, may be executed to determine that the predicted movement is greater than the movement threshold. For example, an item/shuttle tracking engine and/or one or more item/shuttle tracking modules at a controller may determine that the predicted movement is greater than the movement threshold. For example, if the item is predicted to move more than a certain number of inches on the shuttle, the controller may determine that the predicted movement is greater than the movement threshold. In some embodiments, the movement threshold may be dynamic. For example, the movement threshold may be greater for relatively small items, and may be less for relatively large items. In another example, the movement threshold may be greater for items that are positioned on the shuttle away from an edge, and may be less for items that are positioned on the shuttle close to an edge of the shuttle, as the item may fall of if it moves.

At block 1150 of the process flow 1000, computer-executable instructions stored on a memory of a device, such as a remote server or a controller, may be executed to v. For example, an item/shuttle tracking engine and/or one or more item/shuttle tracking modules at a controller may cause the speed of the shuttle to be reduced. For example, because the predicted movement may be determined to be greater than the movement threshold, the controller may send a signal to the item sortation system and/or the shuttle to reduce a speed of the shuttle, which may reduce a likelihood of movement of the item on the shuttle. Other actions may include returning a shuttle to a home position, adjusting conveyor offload speed (e.g., to ensure items are offloaded depending on an item position on the conveyor, etc.), rerouting a shuttle, and so forth.

One or more operations of the methods, process flows, or use cases of FIGS. 1-11 may have been described above as being performed by a user device, or more specifically, by one or more program module(s), applications, or the like executing on a device. It should be appreciated, however, that any of the operations of the methods, process flows, or use cases of FIGS. 1-11 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-11 may be described in the context of the illustrative devices, it should be appreciated that such operations may be implemented in connection with numerous other device configurations.

The operations described and depicted in the illustrative methods, process flows, and use cases of FIGS. 1-11 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-11 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 12:
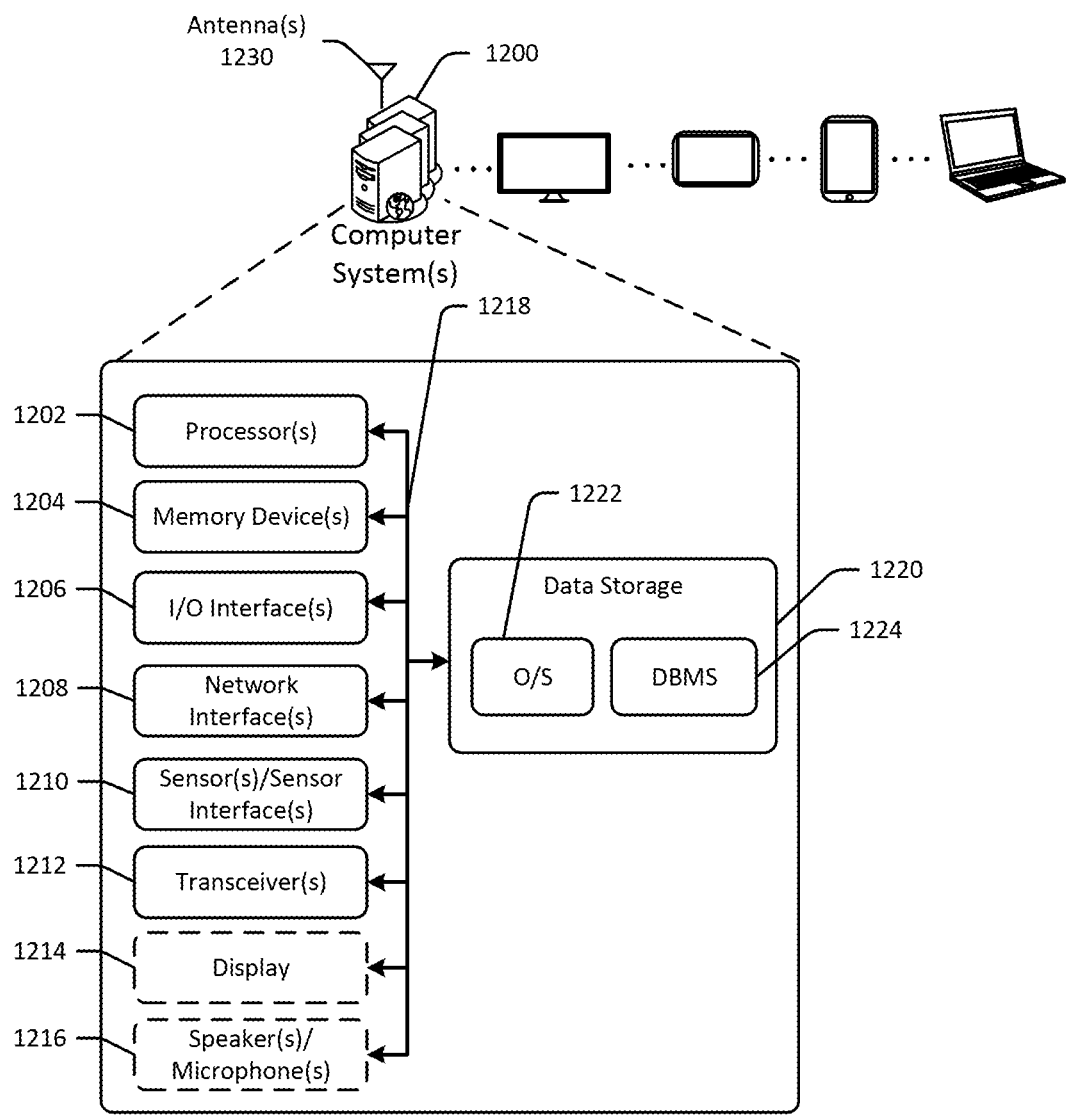
FIG. 12 schematically illustrates an example architecture of a computer system associated with an item sortation system in accordance with one or more embodiments of the disclosure.

FIG. 12 is a schematic block diagram of one or more illustrative computer system(s) 1200 in accordance with one or more example embodiments of the disclosure. The computer system(s) 1200 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 1200 may correspond to an illustrative device configuration for the controller(s) of the camera-based tracking systems and/or sortation systems of FIGS. 1-11.

The computer system(s) 1200 may be configured to communicate with one or more servers, user devices, or the like. The computer system(s) 1200 may be configured to sort items into one or more bins, control activation and/or movement of one or more automated sweepers, control shuttle parameters, such as speed, determine inventory statuses, generate notifications, and so forth.

The computer system(s) 1200 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 1200 may include one or more processors (processor(s)) 1202, one or more memory devices 1204 (also referred to herein as memory 1204), one or more input/output (I/O) interface(s) 1206, one or more network interface(s) 1208, one or more sensor(s) or sensor interface(s) 1210, one or more transceiver(s) 1212, one or more optional display(s) 1214, one or more optional microphone(s) 1216, and data storage 1220. The computer system(s) 1200 may further include one or more bus(es) 1218 that functionally couple various components of the computer system(s) 1200. The computer system(s) 1200 may further include one or more antenna(s) 1230 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1218 may include at least one of a system bus, a memory bus, an address bus, or a message bus, and may permit the exchange of information (e.g., data (including computer-executable code), signaling, etc.) between various components of the computer system(s) 1200. The bus(es) 1218 may include, without limitation, a memory bus or a memory controller, a peripheral bus, an accelerated graphics port, and so forth. The bus(es) 1218 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 1204 of the computer system(s) 1200 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1204 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1204 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1220 may include removable storage and/or non-removable storage including, but not limited to, magnetic storage, optical disk storage, and/or tape storage. The data storage 1220 may provide non-volatile storage of computer-executable instructions and other data. The memory 1204 and the data storage 1220, removable and/or non-removable, are examples of computer-readable storage media (CRSM) as that term is used herein.

The data storage 1220 may store computer-executable code, instructions, or the like that may be loadable into the memory 1204 and executable by the processor(s) 1202 to cause the processor(s) 1202 to perform or initiate various operations. The data storage 1220 may additionally store data that may be copied to the memory 1204 for use by the processor(s) 1202 during the execution of the computer-executable instructions. Moreover, output data generated as a result of execution of the computer-executable instructions by the processor(s) 1202 may be stored initially in the memory 1204, and may ultimately be copied to the data storage 1220 for non-volatile storage.

More specifically, the data storage 1220 may store one or more operating systems (O/S) 1222; one or more database management systems (DBMS) 1224; and one or more program module(s), applications, engines, computer-executable code, scripts, or the like. Some or all of these module(s) may be sub-module(s). Any of the components depicted as being stored in the data storage 1220 may include any combination of software, firmware, and/or hardware. The software and/or firmware may include computer-executable code, instructions, or the like that may be loaded into the memory 1204 for execution by one or more of the processor(s) 1202. Any of the components depicted as being stored in the data storage 1220 may support functionality described in reference to corresponding components named earlier in this disclosure.

The data storage 1220 may further store various types of data utilized by the components of the computer system(s) 1200. Any data stored in the data storage 1220 may be loaded into the memory 1204 for use by the processor(s) 1202 in executing computer-executable code. In addition, any data depicted as being stored in the data storage 1220 may potentially be stored in one or more datastore(s) and may be accessed via the DBMS 1224 and loaded in the memory 1204 for use by the processor(s) 1202 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 1202 may be configured to access the memory 1204 and execute the computer-executable instructions loaded therein. For example, the processor(s) 1202 may be configured to execute the computer-executable instructions of the various program module(s), applications, engines, or the like of the computer system(s) 1200 to cause or facilitate various operations to be performed in accordance with one or more embodiments of the disclosure. The processor(s) 1202 may include any suitable processing unit capable of accepting data as input, processing the input data in accordance with stored computer-executable instructions, and generating output data. The processor(s) 1202 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1202 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1202 may be capable of supporting any of a variety of instruction sets.

Referring now to other illustrative components depicted as being stored in the data storage 1220, the O/S 1222 may be loaded from the data storage 1220 into the memory 1204 and may provide an interface between other application software executing on the computer system(s) 1200 and the hardware resources of the computer system(s) 1200. More specifically, the O/S 1222 may include a set of computer-executable instructions for managing the hardware resources of the computer system(s) 1200 and for providing common services to other application programs (e.g., managing memory allocation among various application programs). In certain example embodiments, the O/S 1222 may control execution of the other program module(s). The O/S 1222 may include any operating system now known or which may be developed in the future including, but not limited to, any server operating system, any mainframe operating system, or any other proprietary or non-proprietary operating system.

The DBMS 1224 may be loaded into the memory 1204 and may support functionality for accessing, retrieving, storing, and/or manipulating data stored in the memory 1204 and/or data stored in the data storage 1220. The DBMS 1224 may use any of a variety of database models (e.g., relational model, object model, etc.) and may support any of a variety of query languages. The DBMS 1224 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 1200 is a mobile device, the DBMS 1224 may be any suitable lightweight DBMS optimized for performance on a mobile device.

Referring now to other illustrative components of the computer system(s) 1200, the input/output (I/O) interface(s) 1206 may facilitate the receipt of input information by the computer system(s) 1200 from one or more I/O devices as well as the output of information from the computer system(s) 1200 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 1200 or may be separate. The I/O devices may further include, for example, any number of peripheral devices such as data storage devices, printing devices, and so forth.

The I/O interface(s) 1206 may also include an interface for an external peripheral device connection such as universal serial bus (USB), FireWire, Thunderbolt, Ethernet port or other connection protocol that may connect to one or more networks. The I/O interface(s) 1206 may also include a connection to one or more of the antenna(s) 1230 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 1200 may further include one or more network interface(s) 1208 via which the computer system(s) 1200 may communicate with any of a variety of other systems, platforms, networks, devices, and so forth. The network interface(s) 1208 may enable communication, for example, with one or more wireless routers, one or more host servers, one or more web servers, and the like via one or more networks.

The antenna(s) 1230 may include any suitable type of antenna depending, for example, on the communications protocols used to transmit or receive signals via the antenna(s) 1230. Non-limiting examples of suitable antennas may include directional antennas, non-directional antennas, dipole antennas, folded dipole antennas, patch antennas, multiple-input multiple-output (MIMO) antennas, or the like. The antenna(s) 1230 may be communicatively coupled to one or more transceivers 1212 or radio components to which or from which signals may be transmitted or received.

As previously described, the antenna(s) 1230 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 1230 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 1230 may be configured to transmit or receive radio frequency signals within any suitable frequency range forming part of the unlicensed portion of the radio spectrum.

The antenna(s) 1230 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1212 may include any suitable radio component(s) for—in cooperation with the antenna(s) 1230—transmitting or receiving radio frequency (RF) signals in the bandwidth and/or channels corresponding to the communications protocols utilized by the computer system(s) 1200 to communicate with other devices. The transceiver(s) 1212 may include hardware, software, and/or firmware for modulating, transmitting, or receiving—potentially in cooperation with any of antenna(s) 1230—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1212 may further include hardware, firmware, or software for receiving GNSS signals. The transceiver(s) 1212 may include any known receiver and baseband suitable for communicating via the communications protocols utilized by the computer system(s) 1200. The transceiver(s) 1212 may further include a low noise amplifier (LNA), additional signal amplifiers, an analog-to-digital (A/D) converter, one or more buffers, a digital baseband, or the like.

The sensor(s)/sensor interface(s) 1210 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 1214 may be configured to output light and/or render content. The optional speaker(s)/microphone(s) 1216 may be any device configured to receive analog sound input or voice data.

It should be appreciated that the program module(s), applications, computer-executable instructions, code, or the like depicted in FIG. 12 as being stored in the data storage 1220 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 1200, and/or hosted on other computing device(s) accessible via one or more networks, may be provided to support functionality provided by the program module(s), applications, or computer-executable code depicted in FIG. 12 and/or additional or alternate functionality. Further, functionality may be modularized differently such that processing described as being supported collectively by the collection of program module(s) depicted in FIG. 12 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 12 may be implemented, at least partially, in hardware and/or firmware across any number of devices.

It should further be appreciated that the computer system(s) 1200 may include alternate and/or additional hardware, software, or firmware components beyond those described or depicted without departing from the scope of the disclosure. More particularly, it should be appreciated that software, firmware, or hardware components depicted as forming part of the computer system(s) 1200 are merely illustrative and that some components may not be present or additional components may be provided in various embodiments. While various illustrative program module(s) have been depicted and described as software module(s) stored in the data storage 1220, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-11 may be performed by a device having the illustrative configuration depicted in FIG. 12, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-11 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-11 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. An item sortation system comprising:
an induction portion at which first items for sortation are inducted into the item sortation system;
an aisle disposed about a center of the item sortation system;
a camera coupled to the item sortation system and configured to image the aisle of the item sortation system;
a first plurality of chutes disposed along a first side of the aisle;
a second plurality of chutes disposed along a second side of the aisle;
a shuttle comprising a conveyor belt, the shuttle configured to transport the first items from the induction portion to a chute of the first plurality of chutes or the second plurality of chutes;
memory configured to store computer-executable instructions; and
at least one processor configured to access the memory and execute the computer-executable instructions to:
determine, using first image data from the camera, a first item disposed on the shuttle at a first location, wherein the shuttle is in motion to a first designated drop off location;
determine a shuttle identifier of the shuttle;
determine the first designated drop off location using the shuttle identifier;
determine that the first item has fallen onto a floor of the aisle;
determine that the first item was not delivered to the first designated drop off location;
determine that an amount of items on the floor of the aisle satisfies a threshold; and
cause a robotic sweeping system to sweep items on the floor to a first end of the aisle.

2. The item sortation system of claim 1, further comprising:
the robotic sweeping system, wherein the robotic sweeping system is disposed in the aisle and configured to sweep items on the floor of the aisle to the first end of the item sortation system, the robotic sweeping system comprising:
a motor; and
a sweeping device.

3. The item sortation system of claim 1, wherein the at least one processor is further configured to access the memory and execute the computer-executable instructions to:
determine that a status of the first item is delivered in an inventory tracking system; and
generate an inventory update notification for the first designated drop off location indicating that the first item was not delivered.

4. The item sortation system of claim 1, wherein the at least one processor is further configured to access the memory and execute the computer-executable instructions to:
determine that the first item moved from a first position to a second position on the shuttle;
determine a second location of the shuttle at which the first item moved;
determine a speed of the shuttle at the second location; and
update a machine learning dataset for a machine learning algorithm using the second location and the speed.

5. A system for an item sortation machine comprising:
a camera configured to image an aisle of the item sortation machine;
memory configured to store computer-executable instructions; and
at least one processor configured to access the memory and execute the computer-executable instructions to:
determine, using first image data from the camera, a first item disposed on a first shuttle at a first location, wherein the first shuttle is in motion to a first designated drop off location;
determine a first shuttle identifier of the first shuttle;
determine the first designated drop off location using the first shuttle identifier;
determine that the first item has fallen onto a floor of the aisle;
determine that the first item was not delivered to the first designated drop off location;
determine that an amount of items on the floor of the aisle satisfies a threshold; and
cause a robotic sweeping system disposed in the aisle to sweep items on the floor to an end of the aisle.

6. The system of claim 5, wherein the at least one processor is further configured to access the memory and execute the computer-executable instructions to:
generate an inventory update notification for the first designated drop off location indicating that the first item was not delivered.

7. The system of claim 5, wherein the at least one processor is further configured to access the memory and execute the computer-executable instructions to:
determine, using second image data from the camera, a second item disposed on a second shuttle at a second location, wherein the second shuttle is in motion to a second designated drop off location;
determine a second shuttle identifier of the second shuttle;
determine the second designated drop off location using the second shuttle identifier;
determine that the second item was delivered to the second designated drop off location; and
generate an inventory update for the second designated drop off location indicating that the second item was delivered.

8. The system of claim 7, wherein the inventory update modifies a status of the second item from undelivered to delivered.

9. The system of claim 5, wherein the at least one processor is further configured to access the memory and execute the computer-executable instructions to:
determine that the first item moved from a first position to a second position on the first shuttle;
determine a second location of the first shuttle at which the first item moved;
determine a speed of the first shuttle at the second location; and
update a machine learning dataset for a machine learning algorithm using the second location and the speed.

10. The system of claim 9, wherein the at least one processor is further configured to access the memory and execute the computer-executable instructions to:
determine that a distance between the first position and the second position is greater than a movement threshold; and
generate a notification indicating that shuttle speed is to be reduced at the second location.

11. The system of claim 9, wherein the at least one processor is further configured to access the memory and execute the computer-executable instructions to:
determine a second item disposed on the first shuttle;
determine one or more of: a size, a weight, or a shape of the second item;
determine a predicted movement of the second item at the second location using the machine learning algorithm;
determine that the predicted movement is greater than the movement threshold; and
cause the speed of the first shuttle to be reduced.

12. The system of claim 5, wherein the at least one processor is further configured to access the memory and execute the computer-executable instructions to:
determine that an amount of vibration of the first shuttle is greater than a predetermined tolerance; and
generate a maintenance notification indicating the first shuttle is due for service.

13. The system of claim 5, wherein the at least one processor is further configured to access the memory and execute the computer-executable instructions to:
determine a second item disposed on the first shuttle;
determine one or more of: a size, a weight, or a shape of the second item; and
determine, based at least in part on the size, weight, or shape, a conveyor speed at which a conveyor of the first shuttle is to offload the second item at a second designated drop off location.

14. The system of claim 13, wherein the at least one processor is further configured to access the memory and execute the computer-executable instructions to:
determine an arrangement of contents in a container at the second designated drop off location; and
determine the conveyor speed based at least in part on the arrangement of contents and the size, weight, or shape.

15. A method comprising:
determining, by a controller using first image data from a camera configured to image an aisle of an item sortation machine, a first item disposed on a first shuttle at a first location, wherein the first shuttle is in motion to a first designated drop off location;
determining a first shuttle identifier of the first shuttle;
determining the first designated drop off location using the first shuttle identifier;
determining that the first item has fallen onto a floor of the aisle;
determining that the first item was not delivered to the first designated drop off location;
determining that the first item moved from a first position to a second position on the first shuttle;
determining a second location of the first shuttle at which the first item moved;
determining a speed of the first shuttle at the second location;
updating a machine learning dataset for a machine learning algorithm using the second location and the speed;
determining a second item disposed on the first shuttle;
determining one or more of: a size, a weight, or a shape of the second item;
determining a predicted movement of the second item at the second location using the machine learning algorithm;
determining that the predicted movement is greater than the movement threshold; and
causing the speed of the first shuttle to be reduced.

16. The method of claim 15, further comprising:
determining that an amount of items on the floor of the aisle satisfies a threshold; and
causing a robotic sweeping system disposed in the aisle to sweep items on the floor to an end of the aisle.

17. The method of claim 15, further comprising:
generating an inventory update notification for the first designated drop off location indicating that the first item was not delivered.

18. The method of claim 15, further comprising:
determining, using second image data from the camera, a second item disposed on a second shuttle at a second location, wherein the second shuttle is in motion to a second designated drop off location;
determining a second shuttle identifier of the second shuttle;
determining the second designated drop off location using the second shuttle identifier;
determining that the second item was delivered to the second designated drop off location; and
generating an inventory update for the second designated drop off location indicating that the second item was delivered, wherein the inventory update modifies a status of the second item from undelivered to delivered.

* * * * *